(12) United States Patent
Kozlak

(10) Patent No.: US 8,070,473 B2
(45) Date of Patent: Dec. 6, 2011

(54) SYSTEM FOR BUILDING THREE-DIMENSIONAL OBJECTS CONTAINING EMBEDDED INSERTS, AND METHOD OF USE THEREOF

(75) Inventor: David M. Kozlak, Minneapolis, MN (US)

(73) Assignee: Stratasys, Inc., Eden Prairie, MN (US)

( * ) Notice: Subject to any disclaimer, the term of this patent is extended or adjusted under 35 U.S.C. 154(b) by 535 days.

(21) Appl. No.: 12/006,947

(22) Filed: Jan. 8, 2008

(65) Prior Publication Data

US 2009/0177309 A1 Jul. 9, 2009

(51) Int. Cl.
*B29C 41/02* (2006.01)

(52) U.S. Cl. ........ 425/375; 425/135; 425/145; 425/162; 425/166; 425/150

(58) Field of Classification Search .................. 425/375, 425/135, 145, 162, 166, 150, 131.1, 60
See application file for complete search history.

(56) References Cited

U.S. PATENT DOCUMENTS

| | | | |
|---|---|---|---|
| 4,665,492 A | 5/1987 | Masters | |
| 5,059,266 A | 10/1991 | Yamane et al. | |
| 5,121,329 A | 6/1992 | Crump | |
| 5,131,706 A * | 7/1992 | Appleberry | 294/119.1 |
| 5,169,081 A | 12/1992 | Goedderz | |
| 5,173,220 A | 12/1992 | Reiff et al. | |
| 5,340,433 A | 8/1994 | Crump | |
| 5,426,722 A | 6/1995 | Batchelder | |
| 5,430,951 A | 7/1995 | Jacky | |
| 5,695,707 A | 12/1997 | Almquist et al. | |
| 5,705,117 A | 1/1998 | O'Connor et al. | |
| 5,807,437 A | 9/1998 | Sachs et al. | |
| 5,866,058 A | 2/1999 | Batchelder et al. | |
| 5,939,008 A | 8/1999 | Comb et al. | |
| 5,965,079 A | 10/1999 | Manners | |
| 6,028,410 A | 2/2000 | Leavitt et al. | |
| 6,054,077 A | 4/2000 | Comb et al. | |
| 6,129,872 A | 10/2000 | Jang | |
| 6,175,422 B1 | 1/2001 | Penn et al. | |
| 6,193,923 B1 | 2/2001 | Leyden et al. | |
| 6,228,923 B1 | 5/2001 | Lombardi et al. | |
| 6,275,157 B1 | 8/2001 | Mays et al. | |
| 6,471,800 B2 | 10/2002 | Jang et al. | |
| 6,574,523 B1 | 6/2003 | Hanna et al. | |
| 6,600,965 B1 | 7/2003 | Hull et al. | |
| 6,629,011 B1 | 9/2003 | Calderon et al. | |

(Continued)

OTHER PUBLICATIONS

Wohler's Report 2007, Part 6: Rapid Manufacturing. Wohler's Associates, Inc., Copyright 2007; pp. 126-127 and 136-137.

(Continued)

*Primary Examiner* — Christina Johnson
*Assistant Examiner* — Xue Liu
(74) *Attorney, Agent, or Firm* — Brian R. Morrison; Westman, Champlin & Kelly, P.A.

(57) ABSTRACT

A system for building a three-dimensional object with a layer-based additive technique, the system comprising a controller configured to receive build sequence data for the three-dimensional object, a head assembly in signal communication with the controller and configured to form a plurality of layers of the three-dimensional object based on the build sequence data, and an insert placement apparatus in signal communication with the controller and configured to place at least one insert in the plurality of formed layers based on the build sequence data.

20 Claims, 12 Drawing Sheets

U.S. PATENT DOCUMENTS

| | | |
|---|---|---|
| 6,685,866 B2 | 2/2004 | Swanson et al. |
| 6,722,872 B1 | 4/2004 | Swanson et al. |
| 6,730,252 B1 | 5/2004 | Teoh et al. |
| 6,813,594 B2 | 11/2004 | Guertin et al. |
| 6,814,907 B1 | 11/2004 | Comb |
| 6,822,609 B2 * | 11/2004 | Mendolia et al. ...... 343/700 MS |
| 6,893,590 B1 | 5/2005 | Rigosi et al. |
| 6,976,627 B1 | 12/2005 | Culp et al. |
| 7,185,734 B2 | 3/2007 | Widmer et al. |
| 7,419,630 B2 | 9/2008 | Palmer et al. ................. 264/401 |
| 7,685,694 B2 | 3/2010 | Zagagi et al. .................... 29/458 |
| 2003/0004600 A1 | 1/2003 | Priedeman, Jr. |
| 2003/0209837 A1 | 11/2003 | Farnworth .................... 264/401 |
| 2004/0129823 A1 * | 7/2004 | Swanson et al. .............. 242/563 |
| 2004/0159978 A1 | 8/2004 | Nielsen et al. |
| 2004/0175450 A1 * | 9/2004 | Yanagisawa et al. ......... 425/135 |
| 2005/0023145 A1 | 2/2005 | Cohen et al. |
| 2005/0147781 A1 | 7/2005 | Dronzek, Jr. et al. |
| 2005/0173838 A1 | 8/2005 | Priedeman et al. |
| 2005/0194401 A1 | 9/2005 | Khoshnevis |
| 2006/0158456 A1 | 7/2006 | Zinniel et al. |
| 2007/0071902 A1 | 3/2007 | Dietrich et al. |
| 2007/0233298 A1 | 10/2007 | Heide et al. |
| 2008/0006966 A1 | 1/2008 | Mannella |

OTHER PUBLICATIONS

Product Description, RepRap Pick and Place Tool, taken from www.reprap.org, published Feb. 11, 2007.
Written Opinion for PCT/US2008/013629.
Office Action dated May 13, 2010 from U.S. Appl. No. 12/006,956, filed Jan. 8, 2008.
Office Action dated Jul. 21, 2010 from U.S. Appl. No. 12/006,955, filed Jan. 8, 2008.

* cited by examiner

SYSTEM FOR BUILDING THREE-DIMENSIONAL OBJECTS CONTAINING EMBEDDED INSERTS, AND METHOD OF USE THEREOF

CROSS-REFERENCE TO RELATED APPLICATION(S)

Reference is hereby made to co-pending U.S. patent application Ser. No. 12/006,956, filed on Jan. 8, 2008, entitled "Method for Building and Using Three-Dimensional Objects Containing Embedded Identification-Tag Inserts", and published as U.S. Patent Application Publication No. 2009/0173443; and to co-pending U.S. patent application Ser. No. 12/006,955 filed on Jan. 8, 2008, and entitled "Method for Building Three-Dimensional Objects Containing Embedded Inserts", and published as U.S. Patent Application Publication No. 2009/0174709.

BACKGROUND

The present invention relates to systems and methods for building three-dimensional (3D) objects. In particular, the present invention relates to rapid prototyping/manufacturing systems and methods for building 3D objects with layer-based additive techniques.

Rapid prototyping/manufacturing systems are used to build 3D objects from computer-aided design (CAD) models using one or more layer-based additive techniques. Examples of commercially available layer-based additive techniques include fused deposition modeling, ink jetting, selective laser sintering, electron-beam melting, and stereolithographic processes. For each of these techniques, the CAD model of the 3D object is initially sliced into multiple horizontal layers. For each sliced layer, a build path is then generated, which provides instructions for the particular rapid prototyping/manufacturing system to form the given layer. For deposition-based systems (e.g., fused deposition modeling and ink jetting), the build path defines the pattern for depositing roads of build material from a moveable deposition head to form the given layer. Alternatively, for energy-application systems (e.g., selective laser sintering, electron-beam melting, and stereolithographic processes), the build path defines the pattern for emitting energy from a moveable energy source (e.g., a laser) to form the given layer.

For example, in a fused deposition modeling system, build material is extruded from a moveable extrusion head, and is deposited as a sequence of roads on a substrate in an x-y plane based on the build path. The extruded build material fuses to previously deposited build material, and solidifies upon a drop in temperature. The position of the extrusion head relative to the substrate is then incremented along a z-axis (perpendicular to the x-y plane), and the process is then repeated to form a 3D object resembling the CAD model.

In fabricating 3D objects by depositing layers of build materials, supporting layers or structures are typically built underneath overhanging portions or in cavities of objects under construction, which are not supported by the build material itself. A support structure may be built utilizing the same deposition techniques by which the build material is deposited. The host computer generates additional geometry acting as a support structure for the overhanging or free-space segments of the 3D object being formed. The support material adheres to the build material during fabrication, and is removable from the completed 3D object when the build process is complete.

While layer-based additive techniques provide durable 3D objects with high resolutions, there is an increasing demand for 3D objects containing embedded inserts, where the embedded inserts are not necessarily fabricated with the layer-based additive techniques. For example, consumers may request 3D objects containing pre-inserted bolts for allowing the 3D objects to be subsequently secured to other components. Currently, embedded inserts are manually inserted in 3D objects during the build operations, which reduces build efficiencies and may result in lower-accuracy placements of the embedded inserts. As such, there is a need for systems and methods for placing inserts in 3D objects during the build operations with layer-based additive techniques.

SUMMARY

The present invention relates to a system and method for building a 3D object with a layer-based additive technique. The system includes a controller configured to receive build sequence data for the 3D object, where the build sequence data is generated using the layer-based additive technique. The system also includes a head assembly in signal communication with the controller and configured to form a plurality of layers of the 3D object based on the build sequence data, and an insert placement apparatus in signal communication with the controller, and configured to place at least one insert in the plurality of formed layers based on the build sequence data.

DETAILED DESCRIPTION

Figure 1:
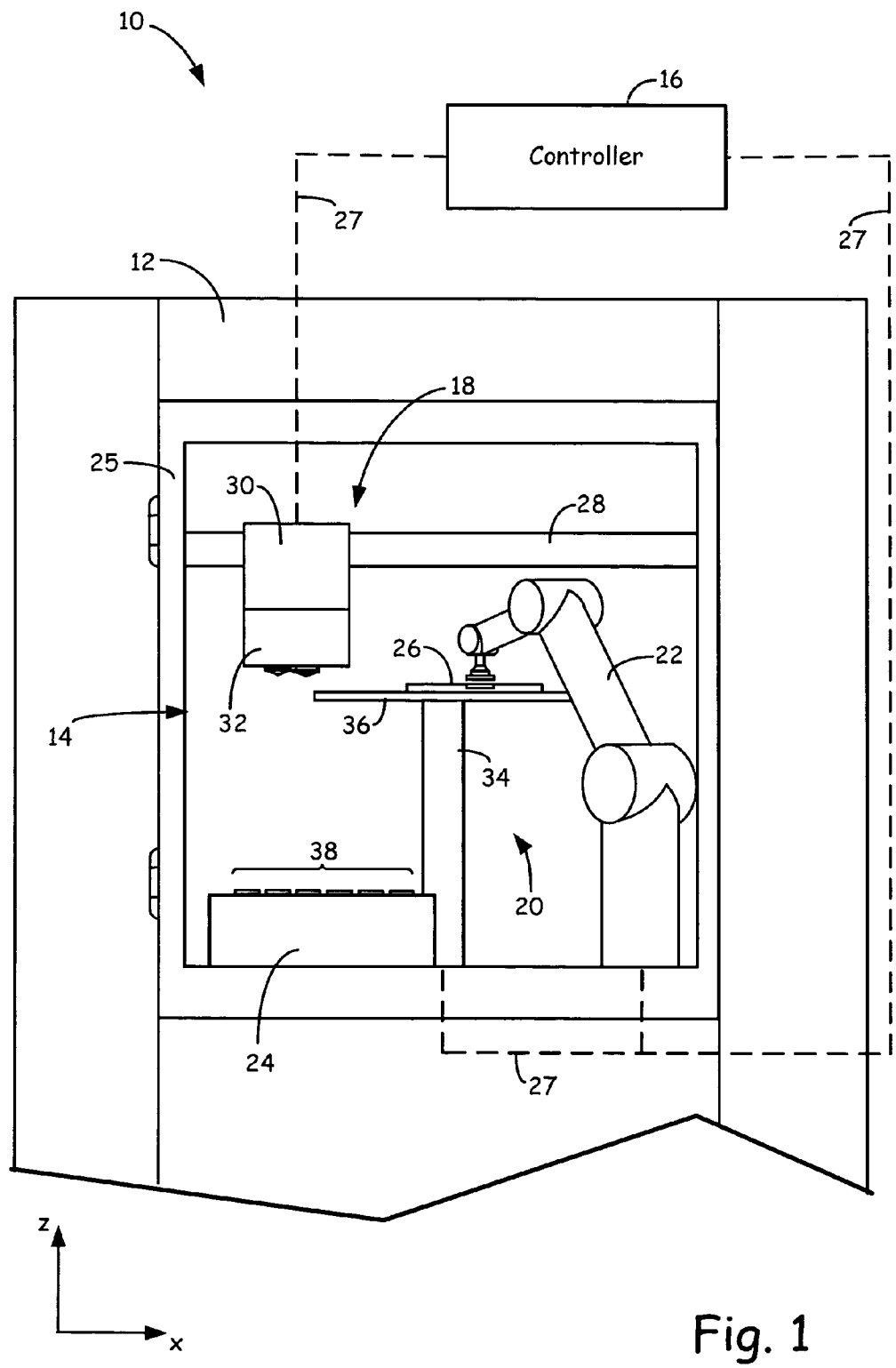
FIG. 1 is a front view of an extrusion-based layered deposition system that includes a robotic arm for placing an embedded insert in a 3D object.

FIG. 1 is a front view of system 10, which is an extrusion-based layered deposition system (e.g., a fused deposition modeling system) for building 3D objects containing one or more embedded inserts. As shown, system 10 includes system casing 12, build chamber 14, controller 16, extrusion head assembly 18, substrate assembly 20, robotic arm 22, and insert magazine 24, where robotic arm 22 and insert magazine 24 are disposed within build chamber 14 for placing inserts within 3D objects during build operations. As discussed below, robotic arm 22 and insert magazine 24 allow inserts to be placed in 3D objects with increased accuracy and reduced delays in the deposition sequences, thereby substantially preserving the throughput of system 10.

System casing 12 is a casing structure of system 10 that provides an enclosed environment for build chamber 14, and includes access door 25, where access door 25 is a window-paned door through which build chamber 14 is observable and accessible. Build chamber 14 is an enclosed environment that contains extrusion head assembly 18, substrate assembly 20, robotic arm 22, and insert magazine 24 for building a 3D object that contains one or more embedded inserts (referred to as 3D object 26). During a build operation, build chamber 14 is desirably heated to an elevated temperature to reduce the effects of shrinkage and distortion on extruded materials. Controller 16 is a computer-operated controller that is in signal communication with extrusion head assembly 18, substrate assembly 20, and robotic arm 22 via communication lines 27 (shown with broken lines). This allows controller 16 to control the operation of extrusion head assembly 18, substrate assembly 20, and robotic arm 22 based on build sequence data received from a host computer (not shown). Controller 16 may be provided as a single control unit or as a network of multiple control units.

Extrusion head assembly 18 includes x-axis gantry 28, y-axis gantry 30, and extrusion head 32, where x-axis gantry 28 and y-axis gantry 30 are guide rails configured to move extrusion head 32 in a horizontal x-y plane within build chamber 14 based on signals provided from controller 16. The horizontal x-y plane is a plane defined by an x-axis and a y-axis (not shown in FIG. 1), where the x-axis, the y-axis, and the z-axis are orthogonal to each other. As used herein, the term "axis" refers to a coordinate axis of a spatial coordinate system (e.g., a Cartesian coordinate system). Examples of suitable arrangements for x-axis gantry 28 and y-axis gantry 30 include those disclosed in Swanson et al., U.S. Pat. No. 6,722,872, entitled "High Temperature Modeling Apparatus".

Extrusion head 32 is a moveable deposition head supported by x-axis gantry 28 and y-axis gantry 30 for building 3D object 26 (and any corresponding support structure) on substrate assembly 20 in a layer-by-layer manner with an extrudable build material (and any corresponding support material). Extrusion head 32 is desirably pre-calibrated along the x-axis, the y-axis, and the z-axis to accurately deposit the build and support materials. In the embodiment shown in FIG. 1, extrusion head 32 is a dual-tip extrusion head configured to deposit build and support materials from filament feed stocks (not shown). Examples of suitable extrusion heads for extrusion head 32 include those disclosed in LaBossiere, et al., U.S. Patent Application Publication No. 2007/0003656, entitled "Rapid Prototyping System With Controlled Material Feedstock"; LaBossiere, et al., U.S. Pat. No. 7,604,470, entitled "Single-Motor Extrusion Head Having Multiple Extrusion Lines"; and Leavitt, U.S. Pat. No. 7,625,200, entitled "Extrusion Head For Use In Extrusion-Based Layered Deposition System".

Substrate assembly 20 includes z-axis gantry 34 and substrate platform 36, where z-axis gantry 34 is a guide rail configured to move substrate platform 36 along the z-axis within build chamber 14 based on signals provided from controller 16. Substrate platform 36 is a platform supported by z-axis gantry, and is the surface on which 3D object 26 is built. During a build operation, substrate platform 36 is moved downward incrementally along the z-axis to allow successive layers of 3D object 26 to be built. Accordingly, substrate platform 36 is desirably pre-calibrated at least along the z-axis to provide accurate incremental movements. In an alternative embodiment, substrate assembly 20 may be configured to move in the horizontal x-y plane within build chamber 14, and extrusion head 32 may be configured to move along the z-axis. Other similar arrangements may also be used such that one or both of extrusion head 32 and substrate platform 36 are moveable relative to each other. For example, extrusion head 32 may be fixed and substrate platform 36 is moveable in the x-y-z coordinate system, or substrate platform 36 may be fixed and extrusion head 32 is moveable in the x-y-z coordinate system.

Robotic arm 22 is an automated insert-placement apparatus disposed within build chamber 14, and is configured to retrieve one or more inserts from insert magazine 24 (referred to as inserts 38), and to place insert(s) 38 in 3D object 26 during a build operation. This allows insert(s) 38 to be partially or completely embedded within the layers of 3D object 26. Robotic arm 22 is rotatably mounted to a floor (not shown in FIG. 1) of build chamber 14, and is desirably capable of maneuvering with multiple degrees of freedom to retrieve and place insert(s) 38 based on signals provided from controller 16. Because robotic arm 22 is configured to maneuver to various locations within build chamber 14, robotic arm 22 is desirably pre-calibrated along the x-axis, the y-axis, and the z-axis to allow accurate positioning within build chamber 14.

Insert magazine 24 is a magazine that provides a supply of inserts 38 for robotic arm 22 to retrieve. Insert magazine 24 is desirably located in build chamber 14 such that each insert 38 is positioned at a predetermined location along the x-axis, the y-axis, and the z-axis within build chamber 14. This allows controller 16 to direct robotic arm 22 to the appropriate location within build chamber 14 to retrieve each insert 38 during the build operation. In an alternative embodiment, system 10 may include one or more optical sensors (not shown) in signal communication with controller 16 to identify the location of each insert 38. In additional alternative embodiments, inserts 38 may be provided in a variety of different supply components, such as containers, belts, and cartridges.

As discussed above, robotic arm 22 and insert magazine 24 are desirably disposed within build chamber 14. This is beneficial for reducing delays in the deposition sequence, which substantially preserves the throughput of system 10. As discussed above, during a build operation, build chamber 14 is desirably heated to an elevated temperature to reduce the effects of shrinkage and distortion on the extruded build materials. Retaining robotic arm 22 and insert magazine 24 within build chamber 14 precludes the need to open build chamber 14 (via door 25) to place inserts 38 in 3D object 26. Opening door 25 to place inserts 38 in 3D object 26 may modify the environment within build chamber 14, which correspondingly may undesirably affect the physical properties of the deposited layers of 3D object 26. Additionally, opening door 25 requires a delay time in the deposition sequence to allow build chamber 14 regain the desired elevated temperature. If multiple inserts 38 are placed in a single 3D object 26, such delay times can substantially increase the overall build time. Furthermore, placing robotic arm 22 and insert magazine 24 within build chamber 14 also reduces the need for operators to be present during the build operation, thereby allowing personnel to perform other tasks while 3D object 26 is being built.

Additionally, retaining inserts 38 within build chamber 14 allows inserts 38 to be preheated prior to placement in 3D object 26. Due to thermal expansion issues, inserts 38 are desirably heated to the elevated temperature of build chamber 14 prior to placement in 3D object 26. If inserts 38 were otherwise retained outside of build chamber 14, inserts 38 would require a separate preheating step prior to placement in 3D object 26, which may also increase the overall build time.

Retaining robotic arm 22 and insert magazine 24 within build chamber 14 also provides a compact design that allows robotic arm 22 and insert magazine 24 to be integrated in the same system as extrusion head 32. This reduces the overall footprint of system 10, and allows system 10 to be installed and operated in smaller areas.

Furthermore, manual placements of inserts 38 may reduce the accuracy of the placement in 3D object 26. As discussed below, controller 16 directs robotic arm 22 and extrusion head 32 based on data relating to a build sequence for 3D object. As such, controller 16 is capable of coordinating the maneuvering of robotic arm 22 with the movement of extrusion head 32, thereby providing accurate alignments between the deposited roads of build and/or support materials and the placements of inserts 38.

Figure 2:
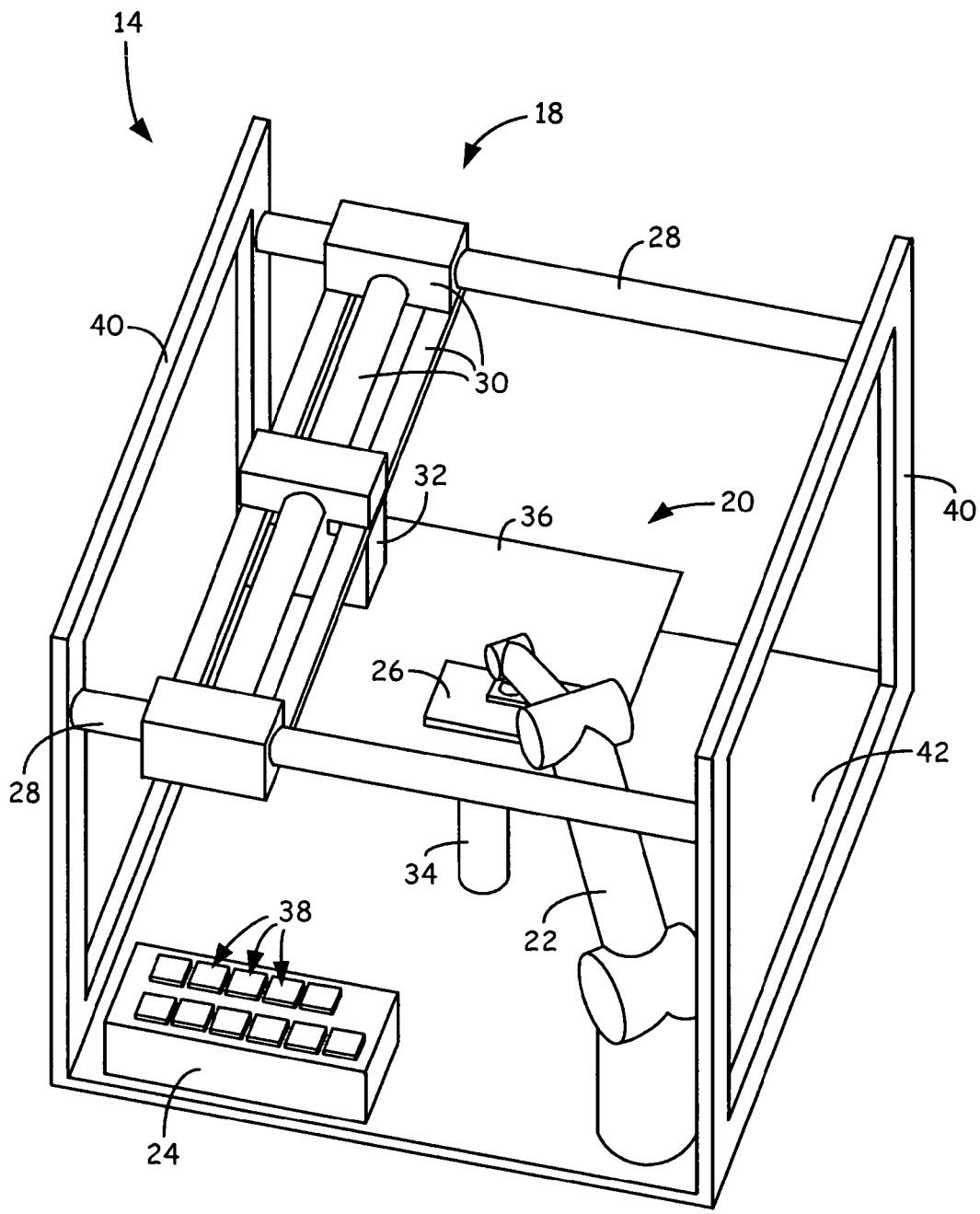
FIG. 2 is a top perspective view of the build chamber of the extrusion-based layered deposition system.

FIG. 2 is a top perspective view of build chamber 14 of system 10, where system casing 12 and controller 16 are omitted for ease of discussion. As shown, build chamber 14 includes frame 40 and chamber floor 42, where frame 40 is a rigid structure that supports x-axis gantry 28, thereby allowing extrusion head 32 to move in the horizontal x-y plane within build chamber 14. Chamber floor 42 is the floor of build chamber 14 and provides a support surface for robotic arm 22, insert magazine 24, and z-axis gantry 34.

Prior to initiating a build operation, a host computer (not shown) slices a CAD model corresponding to 3D object 26 into multiple horizontally sliced layers. For each sliced layer, the host computer then generates a build path for depositing roads of build material from extrusion head 32. The host computer may also generate build paths for depositing roads of support material for corresponding support structures. During the generation of the build paths, the host computer also identifies the one or more locations where insert(s) 38 are to be placed. For each of these identified locations, the host computer then generates an insert placement sequence for robotic arm 22 to perform. The resulting build sequence data that is relayed to controller 16 accordingly includes the deposition sequence for extrusion head 32 to perform and the placement sequence for robotic arm 22 to perform. In one embodiment, the build sequence data is generated pursuant to one or more of the methods disclosed in U.S. Patent Application Publication No. 2009/0174709, entitled "Method for Building Three-Dimensional Objects Containing Embedded Inserts".

During the build operation, controller 16 (shown in FIG. 1) directs robotic arm 22 and extrusion head 32 to build 3D object 26 based on the received build sequence data. For example, controller 16 may direct extrusion head 32 to move in the horizontal x-y plane within build chamber 14 (via x-axis gantry 28 and y-axis gantry 30), and to deposit build and/or support materials on substrate platform 36 to form one or more layers of 3D object 26. Between each layer formed, controller 16 also directs substrate platform 36 to move downward along the z-axis by a single layer increment (via z-axis gantry 34). At a predetermined point in the deposition sequence, controller 16 directs extrusion head 32 to move to a remote location from substrate platform 36 within build chamber 14. This reduces the risk of having robotic arm 22 collide with extrusion head 32 during the insert retrieval and placement step.

Controller 16 then directs robotic arm 22 to maneuver over to insert magazine 24 and retrieve one of inserts 38. As discussed above, insert magazine 24 is desirably positioned within build chamber 14 such that robotic arm 22 maneuvers to the appropriate location within build chamber 14 to retrieve one of inserts 38. Robotic arm 22 then maneuvers over to the deposited layers of 3D object 26 and places the retrieved insert 38 in a specified orientation at a predetermined location in the deposited layers.

Controller 16 then directs robotic arm 22 move to a remote location from substrate platform 36, and directs extrusion head 32 to resume the deposition sequence to form additional layers of 3D object 26. While extrusion head 32 deposits the build and/or support materials, robotic arm 22 may retrieve an additional insert 38 for subsequent placement (i.e., robotic arm 22 and extrusion head 32 may move simultaneously within build chamber 14). The toggling between robotic arm 22 and extrusion head 32 may be performed multiple times during the build operation to place multiple inserts 38 in 3D object 26. When the build operation is complete, 3D object 26 containing the one or more embedded inserts 38 may be removed from build chamber 14, and undergo post-build processing (e.g., support structure removal, vapor smoothing, and packaging).

As used herein, terms referring to the placement of inserts in layers of a 3D object (e.g., 3D object 26) include placements that partially or fully embed the inserts in the completed 3D object. For example, after the build operation is complete, one or more of insert(s) 38 may be partially embedded in 3D object 26 (i.e., having portions extending from the exterior surfaces of 3D object 26), and one or more of insert(s) 38 may be fully embedded within 3D object 26 (i.e., fully encapsulated within 3D object 26). The locations of insert(s) within 3D object 26 may vary depending on the type and function of insert 38 be placed in 3D object 26.

In the embodiment shown in FIGS. 1 and 2, robotic arm 22 and insert magazine 24 are located within build chamber 14 at remote locations from extrusion head 32, and robotic arm 22 is capable of maneuvering independently from extrusion head 32. As such, the operation of robotic arm 22 is independent of the layer-based additive technique used to form the layers of 3D object 26. Accordingly, extrusion head assembly 18 may be replaced with alternative head assemblies, such as alternative deposition head assemblies (e.g., ink jet heads) and energy sources (e.g., lasers and electron beam emitters). For example, extrusion head 32 may be replaced with one or more ink jetting heads (not shown) that include arrays of downward facing jets for ejecting droplets of build and/or support materials. Alternatively, extrusion head 32 may be replaced with one or more lasers (not shown) that fuse previously deposited build materials in a layer-by-layer manner (via selective laser sintering) or that cross link polymerizable build materials in a layer-by-layer manner (via stereolithographic processes). Furthermore, extrusion head 32 may be replaced with one or more electron beam emitters (not shown) that fuse previously deposited build materials in a layer-by-layer manner (via electron-beam melting). As discussed above for extrusion head 32, the alternative head assemblies may also be fixed or moveable within the build chamber (e.g., build chamber 14).

While robotic arm 22 is shown in FIG. 2 as being mounted to chamber floor 42, robotic arm 22 may alternatively be mounted to a variety of surfaces in build chamber 14 so long as robotic arm 22 is capable of maneuvering to reach insert magazine 24 and substrate platform 36. For example, robotic arm 22 may alternatively be secured to the laterals walls (not shown) or the ceiling (not shown) of build chamber 14. In one embodiment, robotic arm 22 is suspended from a second y-axis gantry (not shown), where the second y-axis gantry is supported by x-axis gantry 28 in the same manner as y-axis gantry 30. This embodiment may further reduce the footprint area of build chamber 14.

Figure 3A:
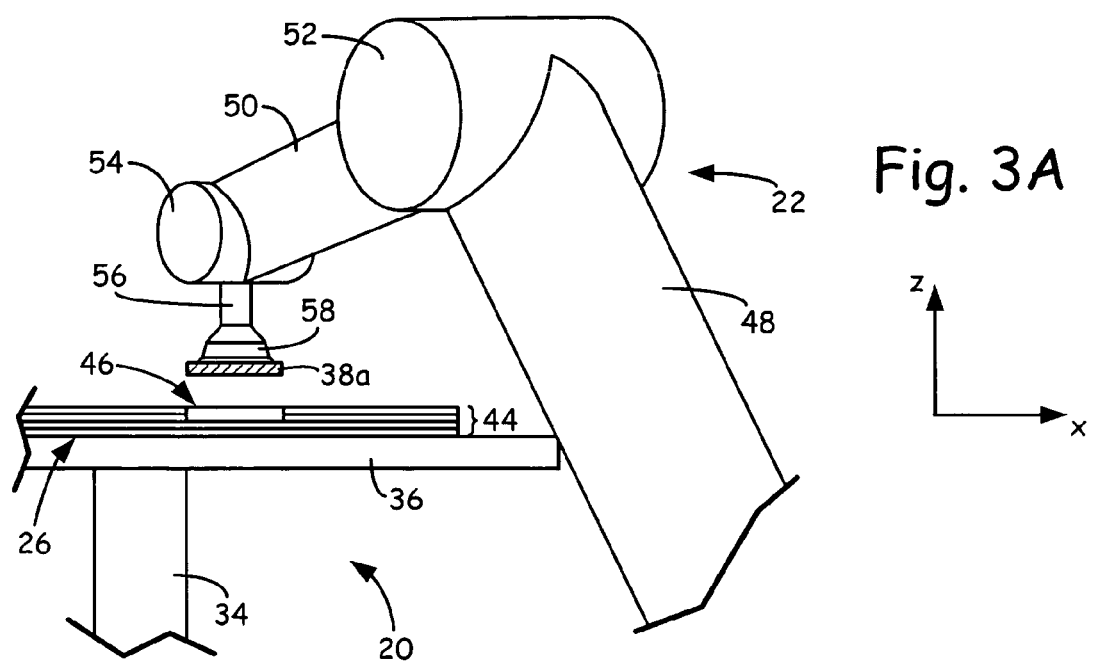
FIGS. 3A and 3B are expanded front views of a substrate assembly, the robotic arm, and the 3D object, further illustrating the placement of the inserts in the 3D object during a build operation.
Figure 3B:
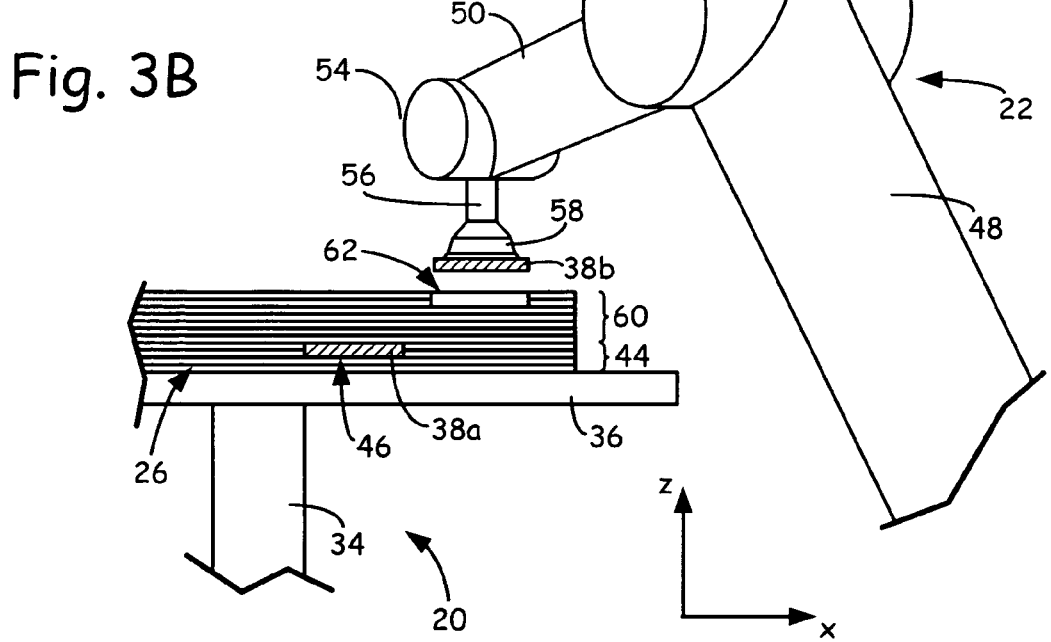

FIGS. 3A and 3B are expanded front views of substrate assembly 20, robotic arm 22, and 3D object 26, further illustrating the placements of inserts 38 in 3D object 26 during a build operation. As shown in FIG. 3A, robotic arm 22 retains insert 38a, which is a first of inserts 38 (shown in FIGS. 1 and 2) retrieved from insert magazine 24 (shown in FIGS. 1 and 2). At this point in the build sequence, 3D object 26 includes deposited layers 44, which are layers of build material previously deposited by extrusion head 32 (shown in FIGS. 1 and 2). The dimensions of layers 44 shown in FIG. 3A are exaggerated for ease of discussion. During the formation of layers 44, the deposition patterns of the build material define pocket 46 in layers 44, where pocket 46 is an open volume that desirably corresponds to the dimensions of insert 38a.

As further shown, robotic arm 22 includes arm portions 48 and 50, hinge members 52 and 54, attachment shaft 56, and vacuum effector 58. Arm portions 48 and 50 are support components pivotally connected with hinge member 52, thereby allowing arm portion 50 to pivot relative to arm portion 48 when directed by controller 16 (shown in FIG. 1). Attachment shaft 56 is connected to arm portion 50 with hinge member 54, thereby allowing attachment shaft 56 to pivot relative to arm portion 50 when directed by controller 16. Attachment shaft 56 is also rotatably secured to hinge member 54, thereby allowing attachment shaft 56 to axially rotate when directed by controller 16.

Vacuum effector 58 is a gripper for retrieving insert 38a from insert magazine 24 and placing insert 38a in pocket 46 of 3D object 26. In this embodiment, robotic arm 22 may include an active vacuum source (not shown) that creates a negative pressure at vacuum effector 58 when directed by controller 16. This allows vacuum effector 58 to retrieve insert 38a from insert magazine 24 and retain insert 38a during transit to 3D object 26 via the negative pressure. The pivoting motion of arm portions 48 and 50, and the pivoting and rotating motion of attachment shaft 56 allows robotic arm 22 to accurately maneuver and align insert 38a with pocket 46 regardless of the location and orientation of pocket 46. When insert 38a is positioned within pocket 46, the negative pressure of vacuum effector 58 is removed, thereby allowing insert 38a to detach from vacuum effector 58 and remain within pocket 46. In alternative embodiments, a positive pressure may also be induced to detach inserts 38a from vacuum effector 58, such as by introducing air through the vacuum line and/or by inertial motion of insert 38a via movement of robotic arm 22. As discussed above, robotic arm 22 may then move away from 3D object 26, and extrusion head 32 may resume depositing build and/or support materials on insert 38a and layers 44 to build subsequent layers of 3D object 26.

As shown in FIG. 3B, robotic arm 22 retains insert 38b, which is a second of inserts 38 (shown in FIGS. 1 and 2) retrieved from insert magazine 24 (shown in FIGS. 1 and 2). At this point in the build sequence, 3D object 26 also includes deposited layers 60, which are layers of build material previously deposited by extrusion head 32 (shown in FIGS. 1 and 2) on layers 44 and insert 38a. During the formation of layers 60, the deposition patterns of the build material define pocket 62 in layers 60, where pocket 62 is an open volume that desirably corresponds to the dimensions of insert 38b.

After extrusion head 32 has deposited the build material for layers 60, controller 16 (shown in FIG. 1) directs robotic arm 22 to place insert 38b into pocket 62. As discussed above, the pivoting motion of arm portions 48 and 50, and the pivoting and rotating motion of attachment shaft 56 allows robotic arm 22 to accurately maneuver and align insert 38b with pocket 62 regardless of the location and orientation of pocket 62. When insert 38b is positioned within pocket 62, the negative pressure of vacuum effector 58 is removed, thereby allowing insert 38b to detach from vacuum effector 58 and remain within pocket 62. Robotic arm 22 may then move away from 3D object 26, and extrusion head 32 may resume depositing build and/or support materials on insert 38b and layers 60 to build subsequent layers of 3D object 26.

In one embodiment, attachment shaft 56 of robotic arm 22 is a universal attachment point for interchangeably connecting multiple effectors, such as vacuum effector 58. This allows robotic arm 22 to be used to retrieve and place a variety of different inserts (e.g., insert 38a) in 3D objects during build operations. For example, vacuum effector 58 may be interchanged with other types of effectors (e.g., mechanical grippers and electrostatic chucks) to accommodate different inserts. This allows a single system 10 to be used to build 3D objects having individualized designs and inserts. Additionally, attachment shaft 56 may include one or more spraying mechanisms to pre-coat metal inserts with coatings, such as polymeric coatings disclosed in Mannella, U.S. Patent Application Publication No. 2008/0006966, entitled "Method For Building Three-Dimensional Objects Containing Metal Parts".

As discussed above, the dimensions of pockets 46 and 62 desirably correspond respectively to the dimensions of inserts 38a and 38b. The corresponding dimensions are attainable because the technique used by the host computer (not shown) to generate the build paths for depositing roads of build and support materials is also suitable for defining the dimensions of pockets 46 and 62. During the data generation steps, when the locations of inserts 38a and 38b are identified in the sliced CAD model, the host computer also identifies the volumes, orientations, and spatial locations of inserts 38a and 38b. The dimensions of pockets 46 and 62 may also be offset to provide dimensions that are slightly greater than or less than the dimensions of inserts 38a and 38b, thereby respectively providing loose or tight clearance fits for inserts 38a and 38b within pockets 46 and 62. The host computer then generates the build paths for depositing roads of build and support materials in a manner that prevents the deposited roads from filling pockets 46 and 62. The resulting build sequence data is then relayed to controller 16 (shown in FIG. 1) for building 3D object 26 with inserts 38a and 38b respectively placed in pockets 46 and 62. In one embodiment, inserts 38a and 38b may include "crown" inserts that provide substantially planar top surface for each of inserts 38a and 38b, as disclosed in disclosed in U.S. Patent Application Publication No. 2009/0174709, entitled "Method for Building Three-Dimensional Objects Containing Embedded Inserts".

Figure 4:
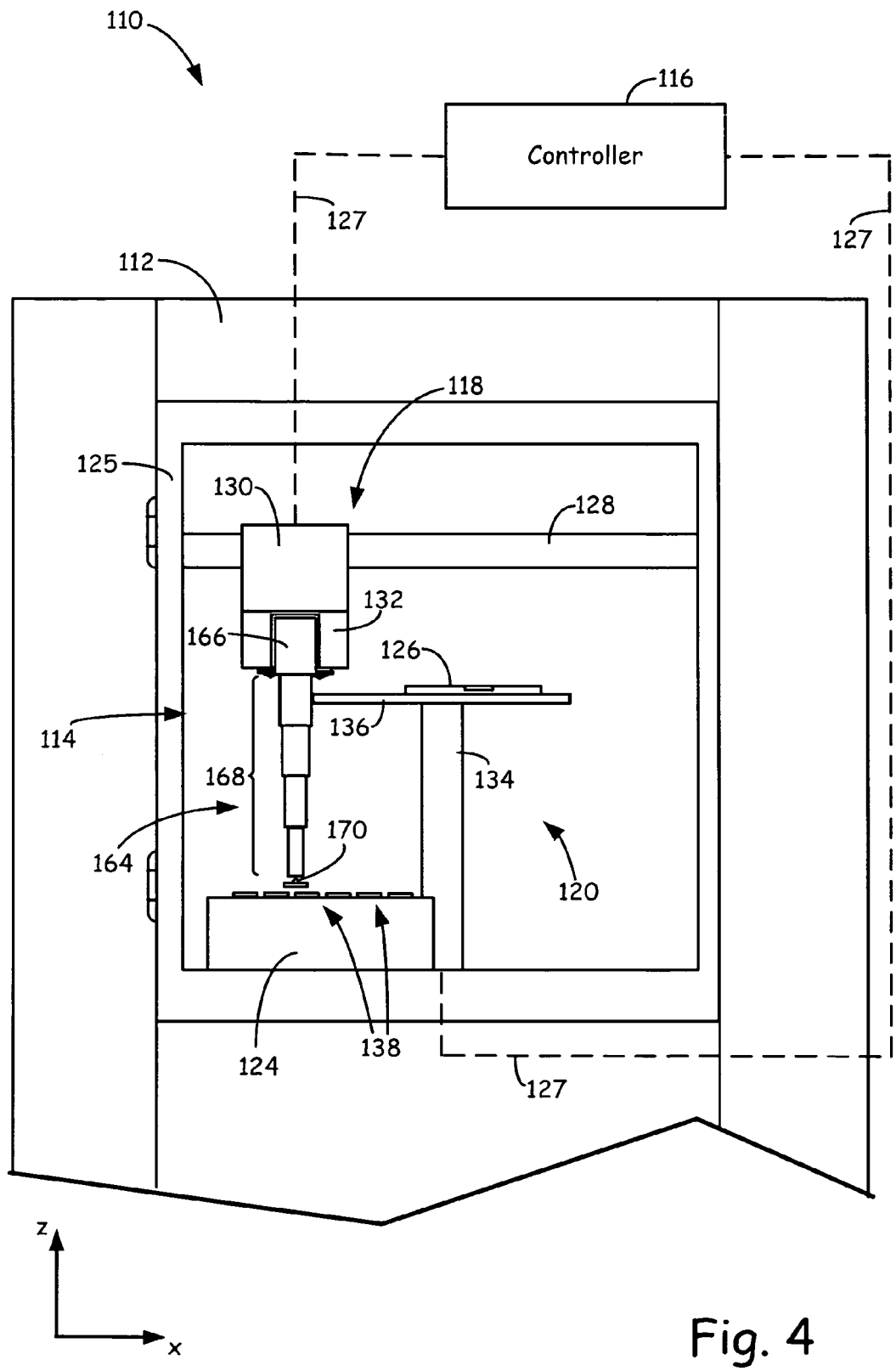
FIG. 4 is a front view of a first alternative extrusion-based layered deposition system that includes a telescoping arm secured to an extrusion head for placing an embedded insert in a 3D object.

FIG. 4 is a front view of system 110, which is a first alternative embodiment to system 10 (shown in FIG. 1), where corresponding reference labels are increased by "100". As shown in FIG. 4, system 110 includes system casing 112, build chamber 114, controller 116, extrusion head assembly 118, substrate assembly 120, insert magazine 124, and telescoping arm 164, where system casing 112, build chamber 114, controller 116, extrusion head assembly 118, substrate assembly 120, and insert magazine 124 function in the same manner as the respective components of system 10. System 110 incorporates telescoping arm 164 in lieu of robotic arm 22 (shown in FIG. 1), where telescoping arm 164 is an automated insert-placement apparatus secured to extrusion head 132. This allows telescoping arm 164 to move in the horizontal x-y plane within build chamber 114 with the motion of extrusion head 132. Accordingly, build chamber 114 may have a smaller footprint area compared to build chamber 14 (shown in FIG. 1), thereby providing a more compact design.

Telescoping arm 164 includes base portion 166, arm segments 168, and vacuum effector 170, where base portion 166 is the portion of telescoping arm 164 that is secured to extrusion head 132. Arm segments 168 are a plurality of tubular segments that interconnect base portion 166 and vacuum effector 170, and have increasing diameters from vacuum effector 170 to base portion 166. This allows arm segments 168 to partially or fully retract within base portion 166, thereby allowing extrusion head 132 to deposit roads of build and/or support materials without interference from telescoping arm 164.

Vacuum effector 170 is a gripper for retrieving and placing inserts 138 in 3D object 126, and functions in the same manner as vacuum effector 58 (shown in FIGS. 3A and 3B). Accordingly, arm segments 168 may extend downward along the z-axis to allow vacuum effector 170 to retrieve one of inserts 138, and then retract upward along the z-axis for transporting the retrieved insert 138. In one embodiment, vacuum effector 170 is rotatably connected to arm segments 168, thereby increasing the freedom of movement of vacuum effector 170.

Figure 5:
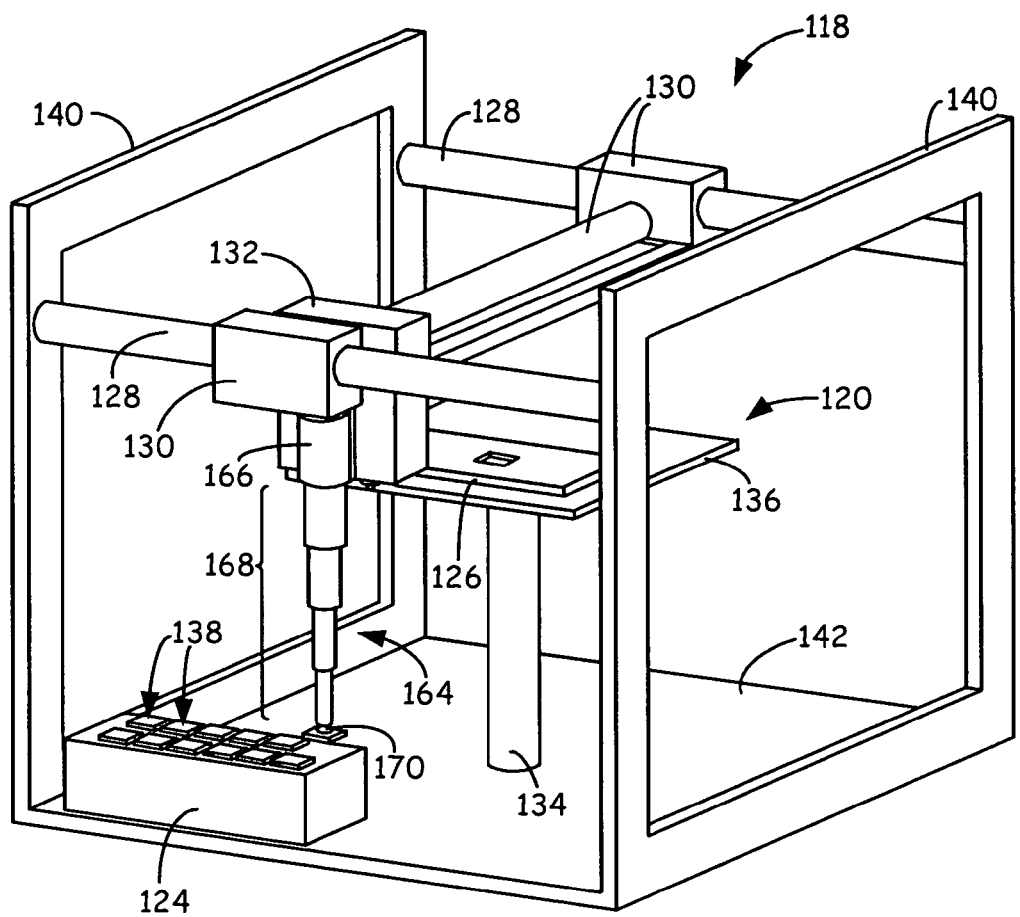
FIG. 5 is a top perspective view of the build chamber of the first alternative extrusion-based layered deposition system.
Figure 5:
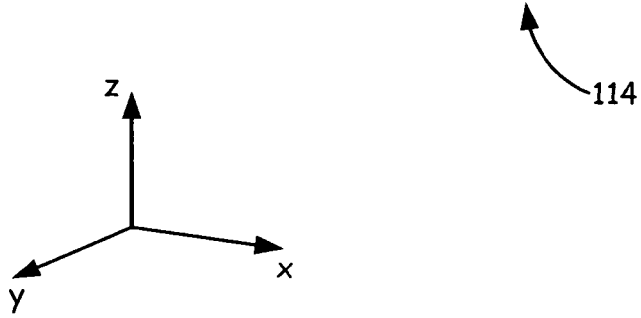

FIG. 5 is a top perspective view of build chamber 114 of system 110, where the system casing 112 and controller 116 are omitted for ease of discussion. As shown, telescoping arm 164 is configured to extend and retract along the z-axis for retrieving one or more inserts 138 from insert magazine 124, and for placing the insert(s) 138 in 3D object 126 during a build operation. This allows insert(s) 138 to be partially or completely embedded within the layers of 3D object 126. Extrusion head 132 and telescoping arm 164 are desirably pre-calibrated along the x-axis, the y-axis, and the z-axis to allow accurate movements within build chamber 114.

In the embodiment shown in FIGS. 4 and 5, telescoping arm 164 is secured to extrusion head 132 within build chamber 114. In alternative embodiments, telescoping arm 164 may be secured to other types of moveable deposition heads. For example, extrusion head 132 may be replaced with one or more ink jetting heads (not shown) that include arrays of downward facing jets for ejecting droplets of build and/or support materials. In this embodiment, telescoping arm 164 is secured to one of the ink jetting heads, thereby allowing telescoping arm 164 to move around within build chamber 114 with the movement of the given ink jetting head. In an additional alternative embodiment, telescoping arm 164 is suspended from a second y-axis gantry (not shown), where the second y-axis gantry is supported by x-axis gantry 128 in the same manner as y-axis gantry 130. This embodiment allows telescoping arm 164 to move independently from, and simultaneously with, extrusion head 132.

Figure 6A:
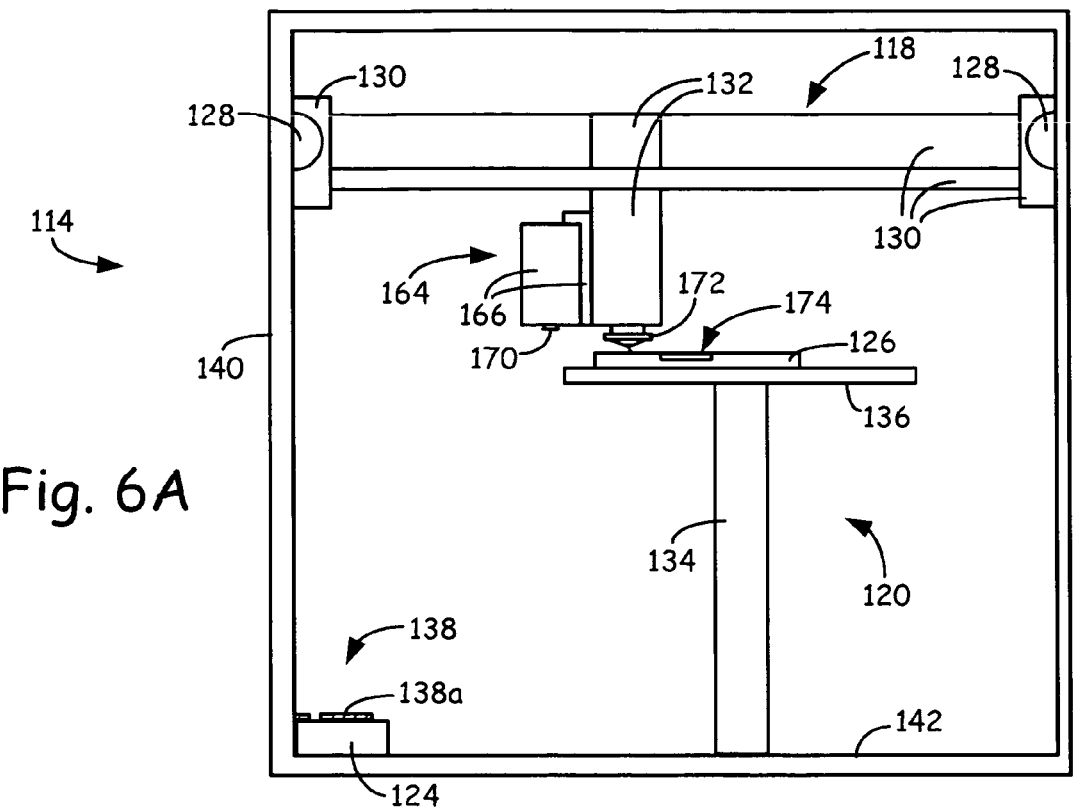
FIGS. 6A-6G are side views of the build chamber of the first alternative extrusion-based layered deposition system, further illustrating the placement of the inserts in the 3D object during a build operation.

FIGS. 6A-6G are side views of build chamber 114, illustrating retrieval and placement of insert 138a during a build operation to form 3D object 126. During the build operation, controller 116 (shown in FIG. 4) directs extrusion head 132 and telescoping arm 164 to build 3D object 126 based on received build sequence data. As shown in FIG. 6A, controller 116 directs extrusion head 132 to deposit roads of build and/or support materials from extrusion tips 172 to form the initial layers of 3D object 126. During the formation of the initial layers, the deposition patterns of the build material define pocket 174, which is an open volume that desirably corresponds to the dimensions of insert 138a. The dimensions of pocket 174 may also be offset to provide a loose or tight clearance fit for insert 138a.

As further shown, during the deposition process, telescoping arm 164 is disposed in a retracted position while extrusion head 132 deposits build and/or support materials to form the initial layers of 3D object 126. The retracted position of telescoping arm 164 desirably maintains vacuum effector 170 at a position along the z-axis that is higher than extrusion tips 172. This prevents vacuum effector 170 (and any retained insert 138) from interfering with the layers of deposited build and support materials.

After the initial deposition process is complete, controller 116 then directs extrusion head 132 to stop depositing the build and/or support materials, and directs x-axis gantry 128 and y-axis gantry 130 to move extrusion head 132 and telescoping arm 164 to a position within build chamber 114 such telescoping arm 164 is aligned along the z-axis with a first of inserts 138 (referred to as insert 138a).

Figure 6B:
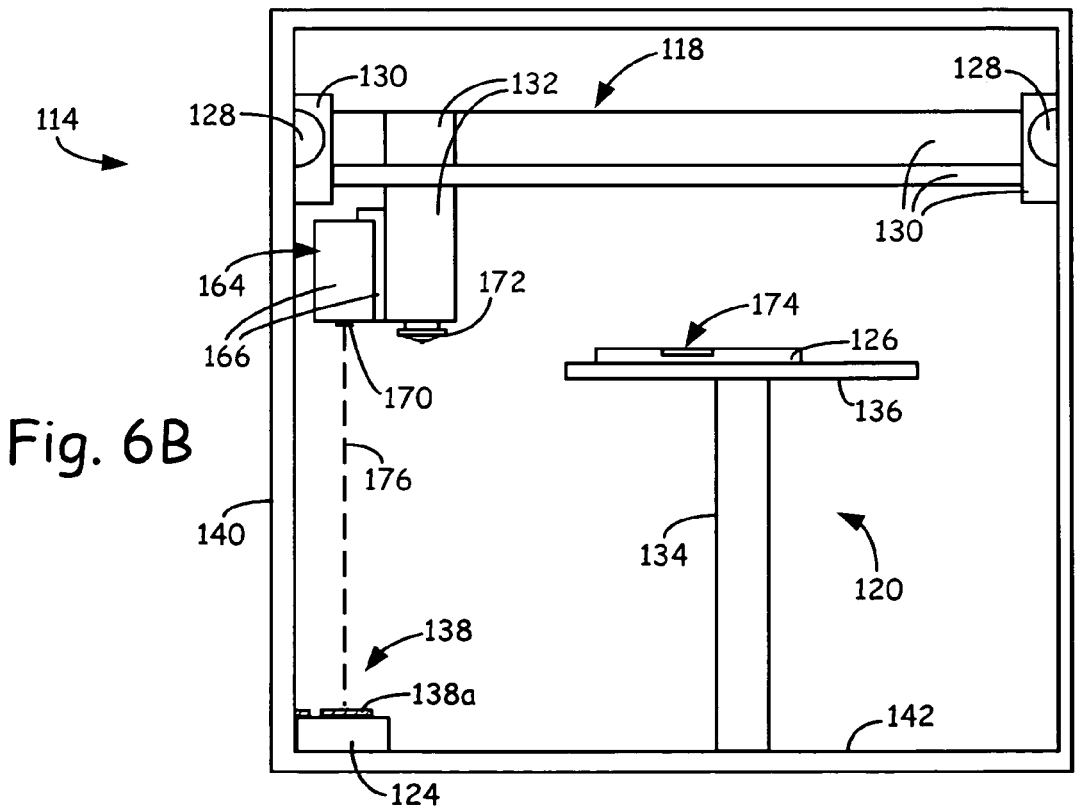

FIG. 6B shows telescoping arm 164 aligned along the z-axis with insert 138a (represented by broken line 176), where arm segments 168 (shown in FIGS. 4 and 5) are in the retracted position. At this point, controller 116 directs arm segments 168 of telescoping arm 164 to extend downward from base portion 166 to retrieve insert 138a. The maximum extension range of arm segments 168 may vary depending on the dimensions and the number of arms segments 168 available. In one embodiment, arm segments 168 are configured to have a maximum extension range that reaches chamber floor 142. This allows telescoping arm 164 to be used with supply components (e.g., insert magazine 124) having a variety of different heights within build chamber 114.

Figure 6C:
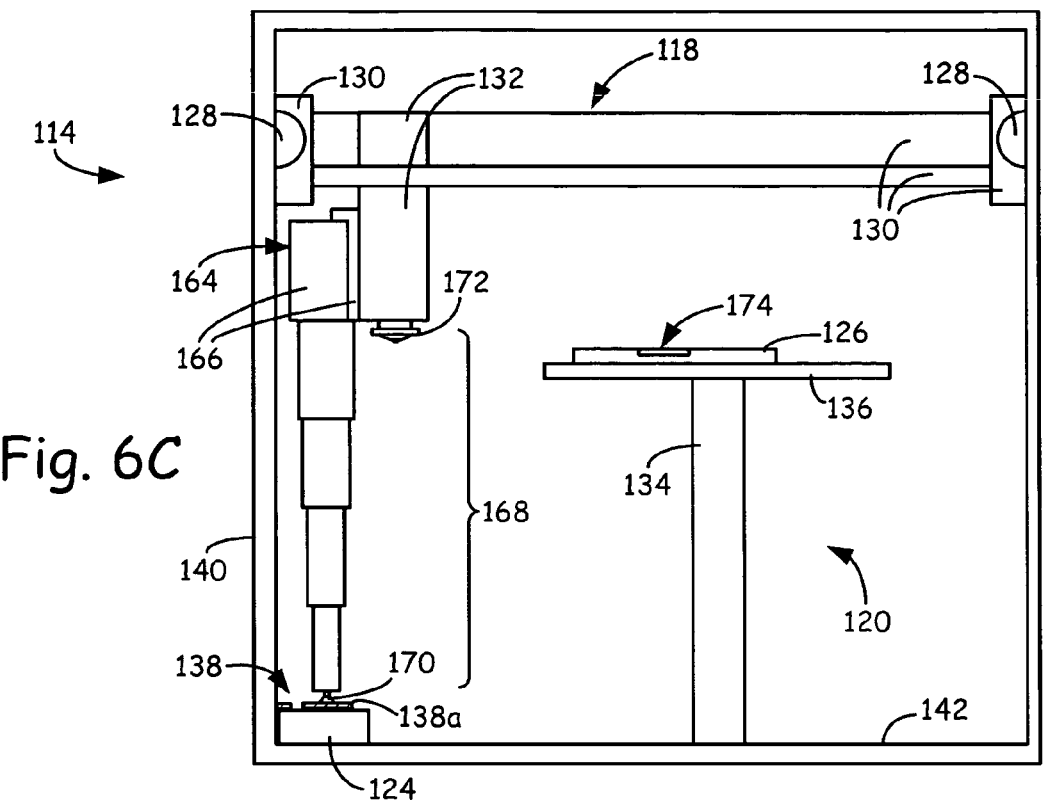

FIG. 6C shows telescoping arm 164 aligned along the z-axis with insert 138a, where arm segments 168 extend downward such that vacuum effector 170 is capable of retrieving insert 138a. In the embodiment shown, telescoping arm 164 may include an active vacuum source (not shown) that creates a negative pressure at vacuum effector 170 in the same manner as discussed above for vacuum effector 58 (shown in FIGS. 3A and 3B). This allows vacuum effector 170 to retrieve insert 138a from insert magazine 124 and retain insert 138a during transit via the negative pressure. After vacuum effector 170 retrieves insert 138a, controller 116 directs arm segments 168 to retract upward into a retracted position within base portion 164.

Figure 6D:
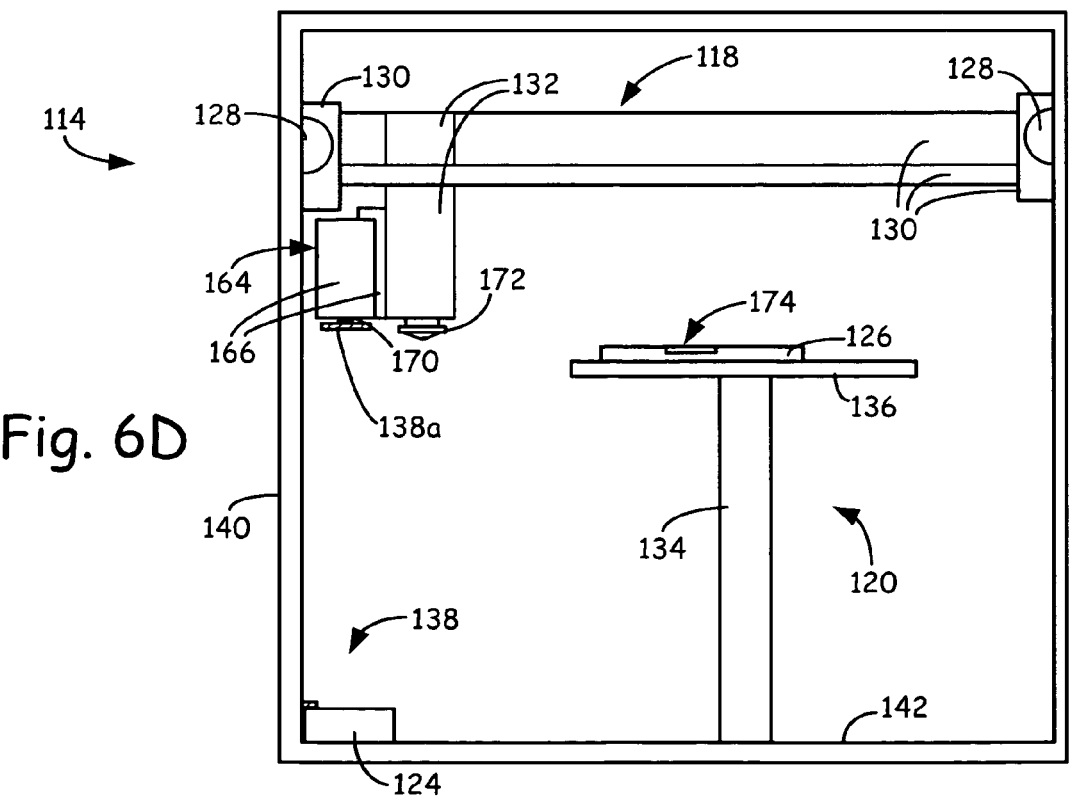

FIG. 6D shows telescoping arm 164 with arm segments 168 retained in the retracted position, where vacuum effector 170 retains insert 138a. As discussed above, the retracted position of telescoping arm 164 desirably maintains vacuum effector 170 at a position along the z-axis that is higher than extrusion tips 172. This reduces the risk of having insert 138a interfere with the deposited layers of build and/or support materials. After arm segments 168 are retained in the retracted position, controller 116 directs x-axis gantry 128 and y-axis gantry 130 to move extrusion head 132 and telescoping arm 164 to a position within build chamber 114 such that insert 138a is aligned along the z-axis with pocket 174. In one embodiment, the retraction of arm segments 168 and the movement of extrusion head 132 and telescoping arm 164 are performed in a substantially simultaneous manner to reduce the amount of time required to perform the retrieval and placement sequence. The movement of extrusion head 132 and telescoping arm 164 is desirably maintained at a rate that allows arm segments 168 to retract into base portion 166 before telescoping arm 164 reaches substrate platform 136. This reduces the risk of a collision between telescoping arm 164 and substrate platform 136.

Figure 6E:
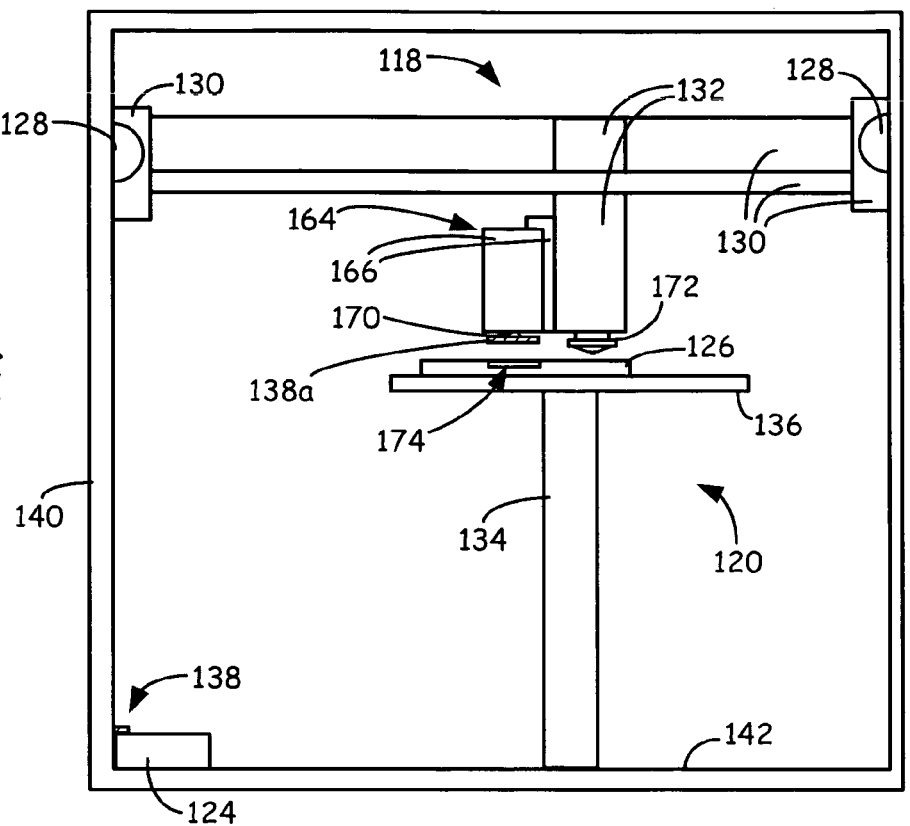

FIG. 6E shows extrusion head 132 and telescoping arm 164 positioned over 3D object 126 such that insert 138a is aligned along the z-axis with pocket 174. Controller 116 then directs telescoping arm 164 to partially extend arm segments 168, thereby placing insert 138a in pocket 174. The positioning of telescoping arm 164 in the x-y plane (via x-axis gantry 128 and y-axis gantry 130), the extension of arm segments 168 along the z-axis, and the rotation of vacuum effector 170 in the x-y plane allows vacuum effector 170 to accurately maneuver and align insert 138a with pocket 174 regardless of the location and orientation of pocket 174.

Figure 6F:
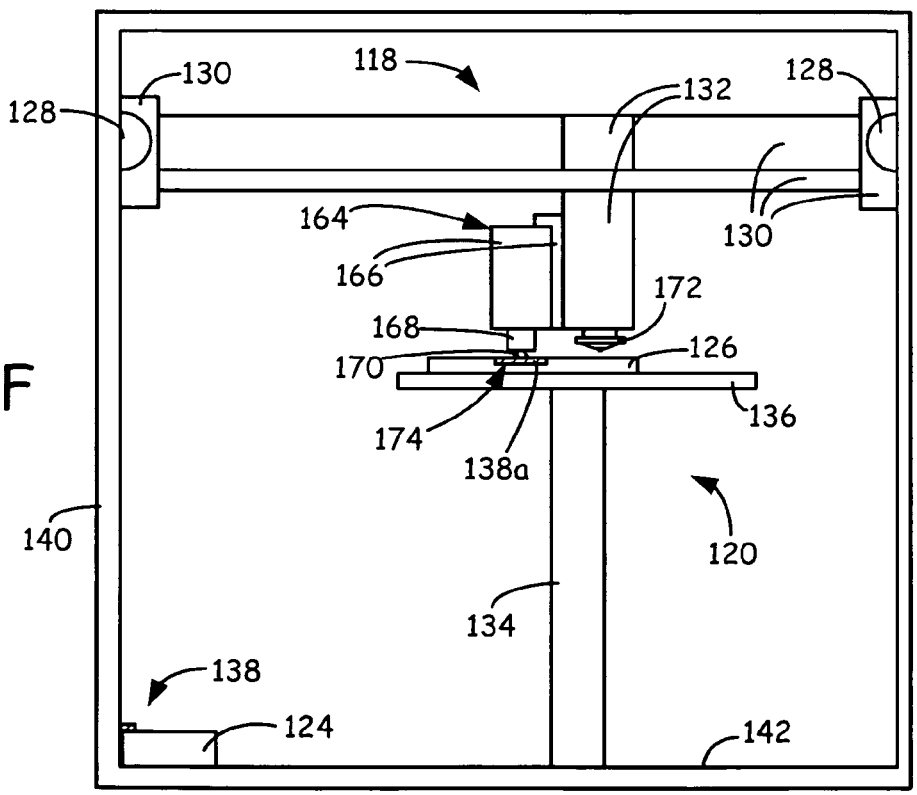

FIG. 6F shows arm segments 168 partially extended such that insert 138a is placed in pocket 174. When insert 138a is placed within pocket 174, the negative pressure of vacuum effector 170 is removed, thereby allowing insert 138a to remove from vacuum effector 170 and remain within pocket 174. In alternative embodiments, a positive pressure may also be induced to detach inserts 138a from vacuum effector 170, such as by introducing air through the vacuum line and/or by inertial motion of insert 138a via movement of telescoping arm 164. Controller 116 may then direct arm segments 168 to retract within base portion 166.

Figure 6G:
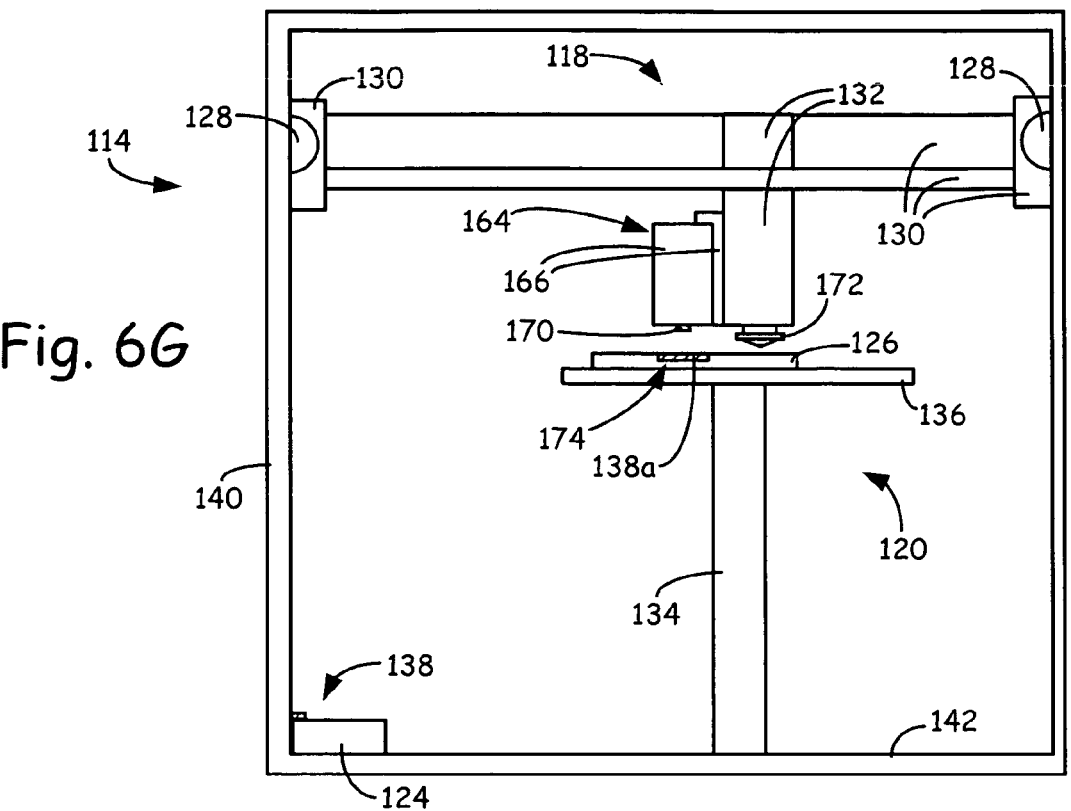

FIG. 6G shows retracted segments 168 in the retracted position within base portion 166. At this point, controller 116 may direct extrusion head 132 to resume the deposition process to form additional layers of build and/or support materials on the previously deposited layers and insert 138a. The toggling between extrusion head 132 and telescoping arm 164 may be performed multiple times during the build operation to place multiple inserts 138 in 3D object 126. When the build operation is complete, 3D object 126 containing the one or more embedded inserts 138 may be removed from build chamber 114, and undergo post-build processing (e.g., support removal, vapor smoothing, and packaging).

Figure 7:
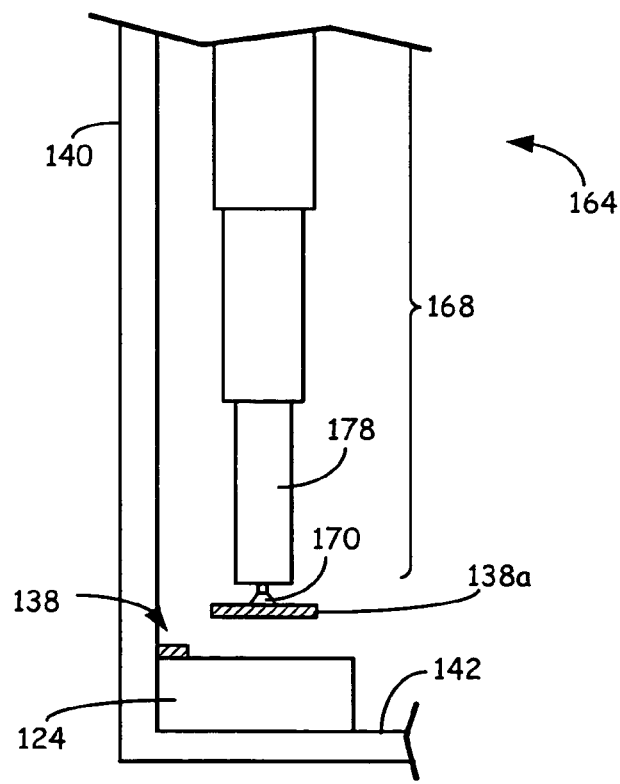
FIG. 7 is an expanded side view of an effector of the telescoping arm, further illustrating the placement of an insert in the 3D object during a build operation.

FIG. 7 is an expanded view of telescoping arm 164 in use with insert 138a. As shown, arm segments 168 include segment member 178, which is the further segment member of arm segments 168 from base portion 166 (shown in FIGS. 4 and 5), and is the segment member that retains vacuum effector 170. As discussed above, vacuum effector 170 is configured to retrieve and retain inserts 138 (e.g., insert 138a) via a negative pressure. In one embodiment, segment member 178 of telescoping arm 164 is a universal attachment point for interchangeably connecting multiple effectors, such as vacuum effector 170. This allows telescoping arm 164 to be used to retrieve and place a variety of different inserts (e.g., insert 138a) in 3D objects during build operations. For example, vacuum effector 170 may be interchanged with other types of effectors (e.g., mechanical grippers and electrostatic chucks) to accommodate different inserts. This allows a single system 110 to be used to build 3D objects having individualized designs and inserts. Additionally, segment member 178 may include one or more spraying mechanisms to pre-coat metal inserts with coatings, such as polymeric coatings disclosed in Mannella, U.S. Patent Application Publication No. 2008/0006966, entitled "Method For Building Three-Dimensional Objects Containing Metal Parts".

Figure 8:
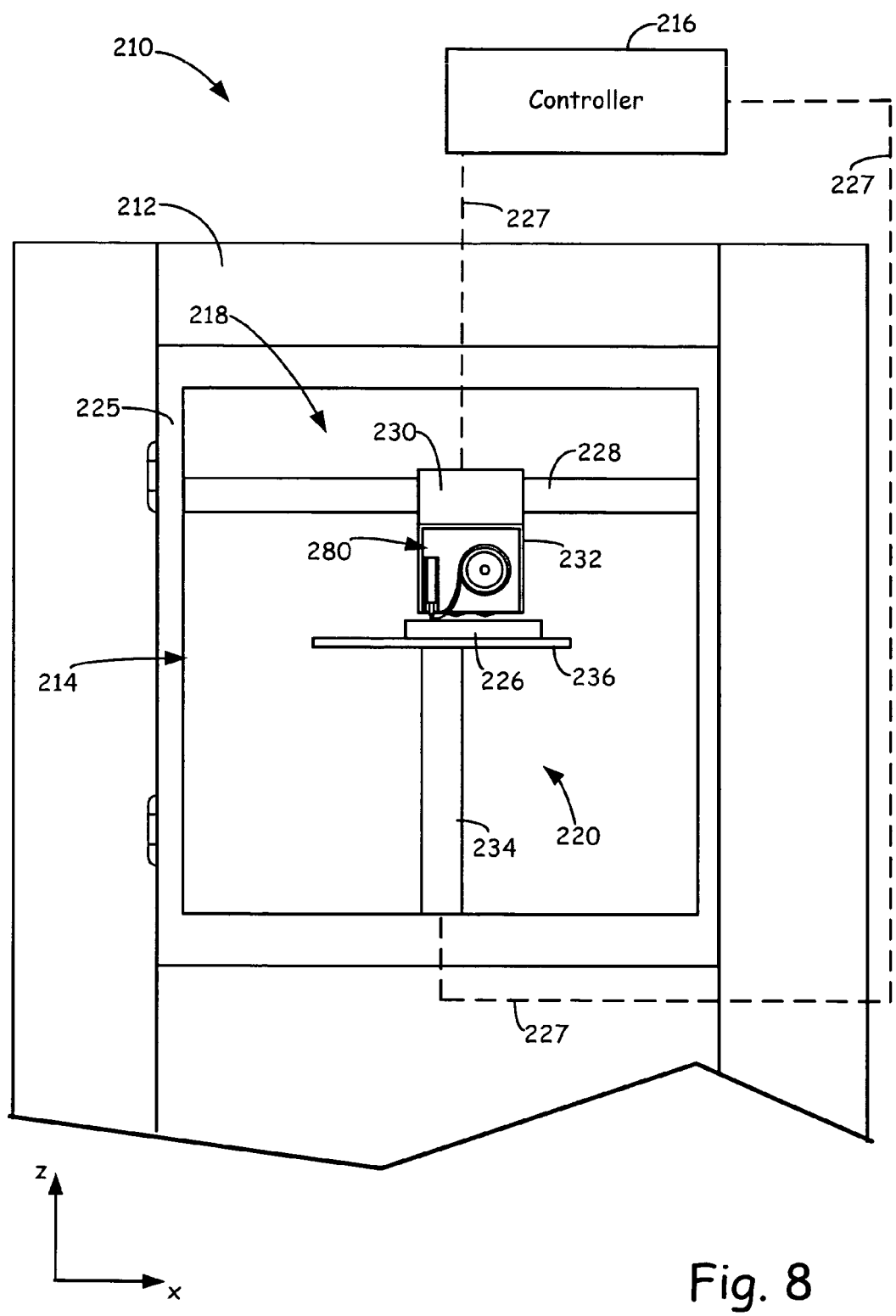
FIG. 8 is a front view of a second alternative extrusion-based layered deposition system that includes a tape dispensing unit secured to an extrusion head for placing an embedded insert in a 3D object.

FIG. 8 is a front view of system 210, which is a second alternative embodiment to system 10 (shown in FIG. 1), where corresponding reference labels are increased by "200". As shown in FIG. 8, system 210 includes system casing 212, build chamber 214, controller 216, extrusion head assembly 218, substrate assembly 220, and tape dispensing unit 280, where system casing 212, build chamber 214, controller 216, extrusion head assembly 218, and substrate assembly 220 function in the same manner as the respective components of system 10. System 210 incorporates tape dispensing unit 280 in lieu of robotic arm 22 (shown in FIG. 1) and insert magazine 24 (shown in FIG. 1), where tape dispensing unit 280 is an automated insert-placement apparatus secured to extrusion head 232. This allows tape dispensing unit 280 to move in the horizontal x-y plane within build chamber 214 with the motion of extrusion head 232. Accordingly, extrusion head 232 and tape dispensing unit 280 are desirably pre-calibrated along the x-axis, the y-axis, and the z-axis to allow accurate movements within build chamber 214.

As discussed below, tape dispensing unit 280 includes a spooled supply of inserts for placement in 3D object 226. This precludes the need for separate supply components (e.g., insert magazines 38 and 138, shown in FIGS. 1 and 4) located within build chamber 214. Additionally, the spooled supply of inserts allows extrusion head 232 to continue to deposit build and/or support materials to form 3D object 226 while tape dispensing unit 280 places one or more inserts in the deposited layers of 3D object 226.

In the embodiment shown in FIG. 8, tape dispensing unit 280 is secured to extrusion head 232 within build chamber 214. In alternative embodiments, tape dispensing unit 280 may be secured to other types of moveable deposition heads in a similar manner to that of telescoping arm 164 (shown in FIGS. 4-7). For example, extrusion head 232 may be replaced with one or more ink jetting heads (not shown) that include arrays of downward facing jets for ejecting droplets of build and/or support materials. In this embodiment, tape dispensing unit 280 is secured to one of the ink jetting heads, thereby allowing tape dispensing unit 280 to move around within build chamber 214 with the movement of the given ink jetting head.

Figure 9:
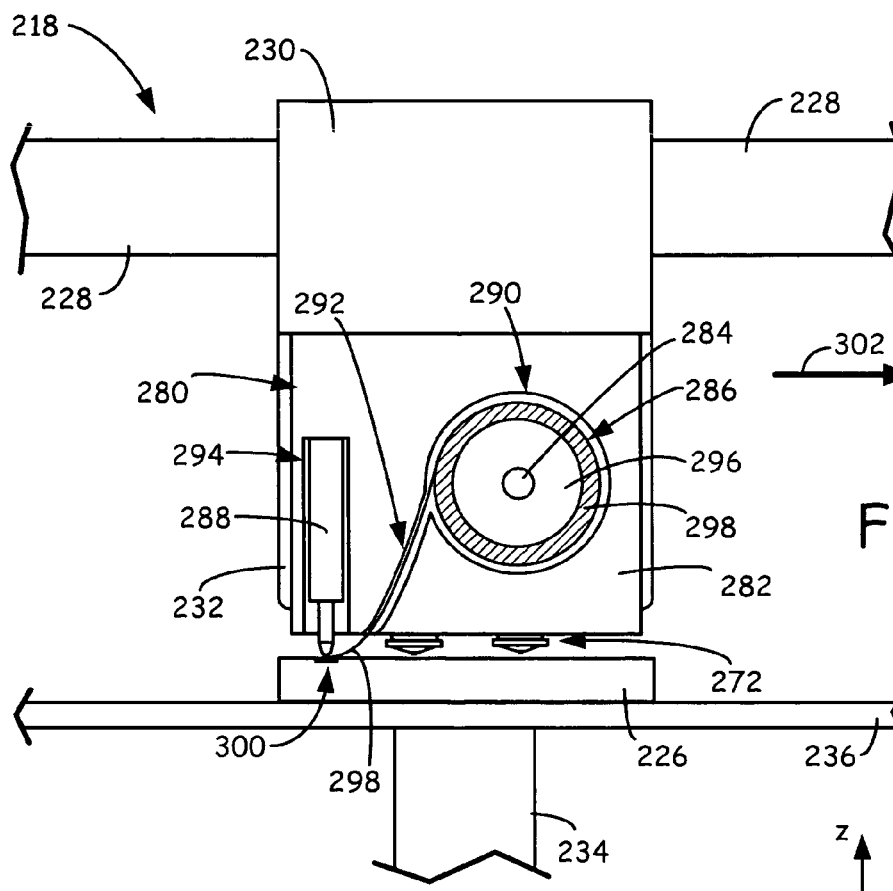
FIG. 9 is an expanded front view of the tape dispensing unit, further illustrating the placement of an insert in the 3D object during a build operation.

FIG. 9 is an expanded view of extrusion head 232 and tape dispensing unit 280, further illustrating the placement of inserts within 3D object 226. As shown, extrusion head 232 includes extrusion tips 272 for depositing build and support materials, and tape dispensing unit 280 includes unit casing 282, spool mount 284, insert spool 286, and compression arm 288. Unit casing 282 is a casing portion of tape dispensing unit 280 that is secured to extrusion head 232, and includes spool recess 290, tape channel 292, and arm slot 294. Spool recess 290 is a circular recess in unit casing 282 for retaining insert spool 286. Tape channel 292 is a channel extending along unit casing 282 from spool recess 290, and provides a pathway for unwinding insert spool 286. Arm slot 294 is a slot extending along the z-axis for retaining compression arm 288.

Spool mount 284 is an axial mount for insert spool 286, where insert spool 286 removably loaded onto spool mount 284. This allows insert spool 286 to be interchanged with additional insert spools (not shown). Insert spool 286 is a supply spool that includes spool frame 296 and insert tape 298, where spool frame 296 is the portion of insert spool 286 that is loaded onto spool mount 284. Insert tape 298 is a flexible tape derived from a plurality of contiguous inserts (not shown in FIG. 8) arranged in a head-to-tail arrangement, where the inserts are separated along insert tape 298 with perforations for ease of separation. During a build operation, successive portions of insert tape 298 are unwound from spool frame 296 and fed through tape channel 292 for placement into a 3D object (e.g., 3D object 226).

In one embodiment, spool mount 284 is a motor-driven mount controlled by a motor (not shown) located within unit casing 282, where the motor rotates spool mount 284 (and correspondingly insert spool 286) based on signals provided by controller 216 (shown in FIG. 8). Alternatively, tape channel 292 may include a pair of motor-driven wheels (not shown) that grip and pull successive portions of insert tape 298 in a similar manner to filament drive wheels (not shown) used to deposit build and support materials from extrusion head 232.

Compression arm 288 is a mechanism movably secured to unit casing 282 within arm slot 294 for placing one or more of the contiguous inserts of insert tape 298 in 3D object 226. An example of a suitable mechanism for compression arm 288 includes a compression solenoid that is configured to move along the z-axis for pressing an insert of insert tape 298 into 3D object 226. Accordingly, during a build operation to form 3D object 226, x-axis gantry 228 and y-axis gantry 230 move extrusion head 232 and tape dispensing unit 280 around within build chamber 114 (shown in FIG. 8), thereby allowing extrusion head 232 to deposit build and/or support materials to form initial layers of 3D object 226. During the formation of the initial layers, the deposition patterns of the build material define pocket 300, which is an open volume that desirably corresponds to the dimensions of the inserts of insert tape 298. The dimensions of pocket 300 may also be offset to provide a loose or tight clearance fit for the inserts of insert tape 298.

Because tape dispensing unit 280 contains a supply of inserts for placement in 3D object 226, extrusion head 232 is not required to stop the deposition process to allow tape dispensing unit 280 to retrieve an insert. Thus, extrusion head 232 may continue to deposit build and/or support materials to form the layers of 3D object 226 while tape dispensing unit 280 places an insert in pocket 300. Accordingly, at a predetermined point in the deposition process when placement arm 286 is aligned with pocket 300 along the z-axis, controller 216 directs tape dispensing unit 280 to unwind a portion of insert tape 298 from insert spool 286. In the embodiment shown in FIG. 9, insert spool 286 is rotated in a counter-clockwise direction to unwind the successive portions of insert tape 298. The unwound portion of insert tape 298 is fed through tape channel 292, which directs insert tape 298 to a position below compression arm 288. In this embodiment, when insert tape 298 is unwound, tape dispensing unit 280 desirably moves in a left-to-right direction in the view shown in FIG. 9 (represented by arrow 302) to prevent the unwound portion of insert tape 298 from getting tangled between the deposited layers of 3D object 226 and tape dispensing unit 280. Controller 216 then directs compression arm 288 to press one of the inserts from insert tape 298 into pocket 300, thereby placing the insert in 3D object 226.

Figure 10:
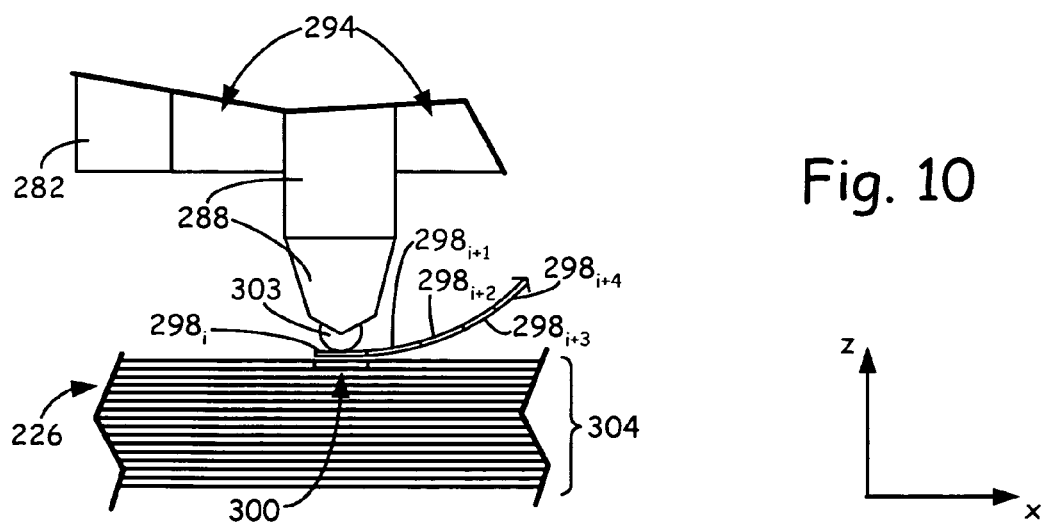
FIG. 10 is an expanded front view of a compression arm and insert tape of the tape dispensing unit, further illustrating the placement of an insert in the 3D object during a build operation.

FIG. 10 is an expanded view of compression arm 288 and 3D object 226, illustrating the placement of inserts in 3D object 226. As shown, compression arm 288 includes roller 303, which is a rotatable roller secured to compression arm 288, and is the portion of compression arm 288 that contacts insert tape 298. As further shown, 3D object 226 includes initial layers 304, where the deposition patterns of initial layers 304 define pocket 300, as discussed above. The dimensions of layers 304 shown in FIG. 10 are exaggerated for ease of discussion. As further shown, tape insert 298 includes inserts $298_i$, $298_{i+1}$, . . . , $298_n$, each of which are arranged in a head-to-tail arrangement and separated along insert tape 298 with perforations. Each of inserts $298_i$, $298_{i+1}$, . . . , $298_n$, also desirably includes an adhesive backing (e.g., a pressure sensitive adhesive) disposed along at least a portion of the downward-facing major surface for adhesion to the initial layers 304.

After insert tape 298 is partially unwound from insert spool 286 (shown in FIG. 9), insert $298_i$ is positioned between roller 303 of compression arm 288 and pocket 300. Controller 216 (shown in FIG. 8) then directs compression arm 288 to press downward along the z-axis against insert $298_i$, thereby pressing the given insert into pocket 300. Controller 116 may also direct insert spool 286 (shown in FIG. 9) to rotate in an opposite rotational direction (e.g., a clockwise direction) to induce a pulling force the perforations of insert tape 298, thereby allowing $298_i$ to separate along the perforation from insert $298_{i+1}$. The adhesive backing of insert $298_i$ allows insert $298_i$ to adhere to initial layers 304 within pocket 300, which allows insert 298; to remain within pocket 300 when compression arm 288 retracts upward along the z-axis. Extrusion head 232 may then continue to deposit build and/or support materials to form additional layers of 3D object 226. While extrusion head 232 continues to deposit build and/or support materials, tape dispensing unit 280 may place additional inserts of insert tape 298 (e.g., $298_{i+1}$, $298_{i+2}$, . . . , $298_n$) in a variety of additional locations in 3D object 226. When the build operation is complete, 3D object 226 containing the one or more embedded inserts of tape insert 298 may be removed from build chamber 214, and undergo post-build processing (e.g., support removal, vapor smoothing, and packaging).

Figure 11:
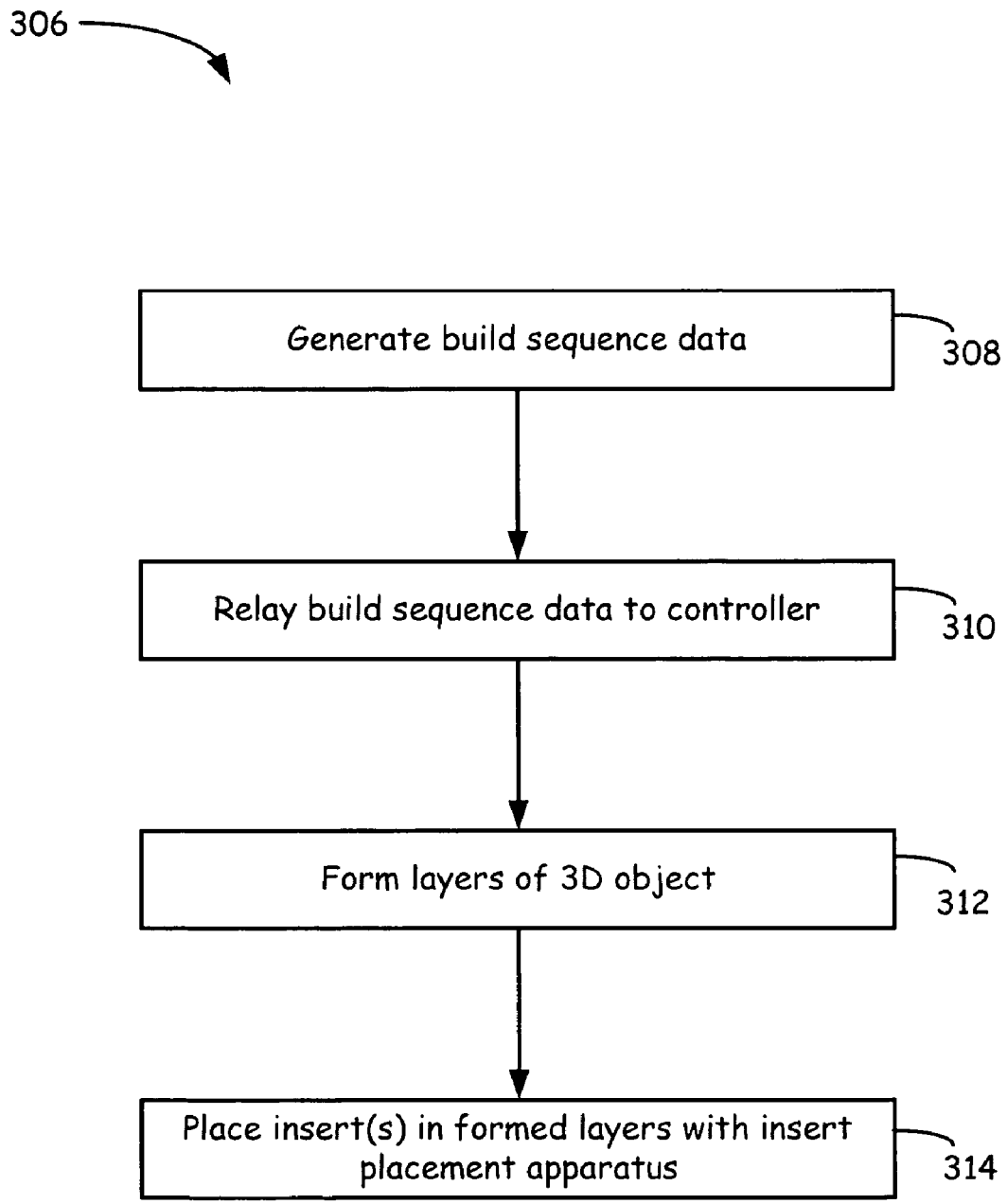
FIG. 11 is a flow diagram of a method for building a 3D object containing one or more embedded inserts.

FIG. 11 is a flow diagram of method 306 for building a 3D object (e.g., 3D objects 26, 126, and 226) containing one or more embedded inserts with a rapid prototyping/manufacturing system that contains a moveable head (e.g., extrusion heads 32, 132, and 232) and an insert placement apparatus (e.g., robotic arm 22, telescoping arm 164, and tape dispensing unit 280). As shown, method 306 includes steps 308-314, and initially involves generating build sequence data for building the 3D object (step 308), where the build sequence data includes data relating to the formation of the 3D object layers and data relating to the placement of the insert(s).

As discussed above, a host computer (not shown) slices a CAD model corresponding to the 3D object into multiple horizontally sliced layers. Based on the sliced layers, the host computer then generates data relating to the formation of the 3D object layers with a layer-based additive technique. For example, the host computer may generate a build path for forming each sliced layer (and any corresponding support structure) with the moveable head. Additionally, the host computer also identifies one or more locations where the inserts are to be placed in the 3D object, and generates data relating to the placement of the insert(s) in the formed layers of the 3D object. In one embodiment, the build sequence data is generated pursuant to the method disclosed in U.S. Patent Application Publication No. 2009/0174709, entitled "Method for Building Three-Dimensional Objects Containing Embedded Inserts".

The resulting build sequence data that contains the data relating to the formation of the 3D object layers and the data relating to the placement of the insert(s) is then relayed to a controller of a rapid prototyping/manufacturing system (e.g., controllers 16, 116, and 216), where the controller is in signal communication with the moveable head and the insert placement apparatus (step 310). The signal communication allows the controller to direct the movements and operations of the moveable head and the insert placement apparatus. Accordingly, the controller directs the moveable head to form the layers of the 3D object based on the data relating to the formation of the 3D object layers (step 312). For example, controller 14 directs extrusion head 32 to deposit roads of build and/or support materials to form initial layers of 3D object 26 (shown in FIG. 1). The controller also directs the insert placement apparatus to place at least one insert in the formed layers of the 3D object based on the data relating to the placement of the insert(s) (step 314). Steps 312 and 314 may then be repeated as necessary to form a 3D object in a layer-by-layer manner containing one or more inserts.

Systems 10, 110, and 210 and method 306 are suitable for placing a variety of different inserts into 3D objects. The type of insert used may vary depending on the desired function of the insert and on the layer-based additive technique used. For example, the inserts are desirably capable of withstanding elevated temperatures that occur with the various layer-based additive techniques. Examples of suitable inserts for use with systems 10, 110, 210 and method 306 include mechanical inserts (e.g., bolts, screws, nuts, bearings, guides, and precision flats), anti-stick components, aesthetic features, electronic components, reinforcing inserts, pre-built layer-based three-dimensional objects, and combinations thereof.

The inserts may also have variable geometries, such as inserts that are cut-to-size, bent, folded, torqued, stretched, tapped, sized, or otherwise modified from stock material shapes to the shape taken by the placed insert. For example, a flexible radio-frequency identification (RFID) tag may be conically bent (e.g., by system 10, 110, or 210) to conform to the interior rim of a smoke detector shell, or a reinforcing wire might be cut and bent in a serpentine system to attain the shape taken by the placed insert. In one embodiment, the intended geometry may be defined by a CAD part designer, and information relating to the intended geometry may be transferred with the insert-placement location and description as part of the CAD model. Additional information that the RP/RM system (e.g., systems 10, 110, and 210) might require to manipulate the insert (e.g., bending radius and wire tension) may also be supplied.

In one embodiment, the inserts include identification tag inserts, as disclosed in U.S. Patent Application Publication No. 2009/0173443, entitled "Method for Building and Using Three-Dimensional Objects Containing Embedded Identification-Tag Inserts". In another embodiment, the inserts include a pair of inserts, where the first insert is a desired component to be placed in the given 3D object, and the second insert is a "crown" insert that covers the first insert and provides a substantially planar top surface, as disclosed in disclosed in U.S. Patent Application Publication No. 2009/0174709, entitled "Method for Building Three-Dimensional Objects Containing Embedded Inserts". In an additional embodiment, the inserts may include one or more polymeric surfaces, as disclosed in Mannella, U.S. Patent Application Publication No. 2008/0006966, entitled "Method For Building Three-Dimensional Objects Containing Metal Parts".

Although the present invention has been described with reference to preferred embodiments, workers skilled in the art will recognize that changes may be made in form and detail without departing from the spirit and scope of the invention.

The invention claimed is:

1. A system for building a three-dimensional object, the system comprising:
   a build chamber having an access door, the build chamber being configured to be heated;
   a controller disposed outside of the build chamber, the controller being configured to receive build sequence data for the three-dimensional object, the build sequence data being generated using a layer-based additive technique;
   a deposition head at least partially disposed in the build chamber and in signal communication with the controller, the deposition head being configured to form a plurality of layers of the three-dimensional object while the access door is closed and the build chamber is heated, based on the build sequence data;
   an insert supply unit disposed in the build chamber, the insert supply unit being configured to retain at least one insert within the build chamber while the deposition head forms at least a portion of the plurality of layers; and
   an insert placement apparatus disposed in the build chamber and in signal communication with the controller, the insert placement apparatus being configured to retrieve the at least one insert from the insert supply unit and to place the at least one insert in the plurality of formed layers while the access door is closed and the build chamber is heated, based on the build sequence data.

2. The system of claim 1, wherein the deposition head comprises an extrusion head having at least one extrusion tip for depositing a thermoplastic material to form the plurality of layers of the three-dimensional object.

3. The system of claim 1, wherein the insert placement apparatus comprises:
   a base portion operably mounted within the build chamber at an offset location from the head assembly;
   at least one arm portion pivotally connected to the base portion; and
   an effector pivotally connected to the at least one arm portion.

4. The system of claim 1, wherein the insert placement apparatus comprises:
   a base portion;
   a plurality of arm segments configured to move between a retracted position and an extended position, wherein the plurality of arm segments are at least partially disposed within the base portion while in the retracted position; and
   an effector connected to the plurality of arm segments.

5. The system of claim 1, wherein the insert supply unit comprises a spool mount configured to receive and retain an insert spool, wherein the insert spool contains the at least one insert as a tape of contiguous inserts, and wherein the insert placement apparatus comprises:
   a compression mechanism configured to press the contiguous inserts from the tape of contiguous inserts; and
   a channel for guiding at least a portion of the tape of contiguous inserts to the compression mechanism.

6. The system of claim 1, wherein the insert placement apparatus is secured to the deposition head.

7. The system of claim 1, wherein:
   the deposition head is configured to form the plurality of layers of the three-dimensional object while the build chamber is heated, based on the build sequence data, such that the at least one of the layers defines a pocket having dimensions that correspond to dimensions of an insert of the at least one insert; and
   the insert placement apparatus is configured to place the insert of the at least one insert in the pocket.

8. The system of claim 1, wherein the insert placement apparatus comprises an attachment point configured to connect to a plurality of interchangeable effectors.

9. A system for building a three-dimensional object, the system comprising:
   a build chamber having an access door, the build chamber being configured to be heated;

a controller disposed outside of the build chamber, the controller being configured to receive build sequence data for the three-dimensional object, the build sequence data being generated using a layer-based additive technique;

a substrate platform disposed in the build chamber and in signal communication with the controller;

a gantry system in signal communication with the controller;

a deposition head at least partially disposed in the build chamber and supported by the gantry system for movement within the build chamber, the deposition head being in signal communication with the controller for depositing a thermoplastic material to form a plurality of layers of the three-dimensional object on the substrate platform while the build chamber is heated, based on the build sequence data;

an insert supply unit disposed in the build chamber, the insert supply unit being configured to retain at least one insert within the build chamber while the deposition head forms at least a portion of the plurality of layers; and an insert placement apparatus disposed in the build chamber and in signal communication with the controller, the insert placement apparatus being configured to retrieve the at least one insert from the insert supply unit and to place the at least one insert in the plurality of formed layers while the access door is closed and the build chamber is heated, based on the build sequence data.

10. The system of claim 9, wherein the insert placement apparatus comprises:
a base portion operably mounted within the build chamber at an offset location from the moveable head;
at least one arm portion pivotally connected to the base portion; and
an effector pivotally connected to the at least one arm portion.

11. The system of claim 9, wherein the insert placement apparatus comprises:
a base portion;
a plurality of arm segments configured to move between a retracted position and an extended position, wherein the plurality of arm segments are at least partially disposed within the base portion while in the retracted position; and
an effector connected to the plurality of arm segments.

12. The system of claim 9, wherein the insert supply unit comprises a spool mount configured to receive and retain an insert spool, wherein the insert spool contains the at least one insert as a tape of contiguous inserts, and wherein the insert placement apparatus comprises:
a compression mechanism configured to press the contiguous inserts from the tape of contiguous inserts; and
a channel for guiding at least a portion of the tape of contiguous inserts to the compression mechanism.

13. The system of claim 9, wherein the insert placement apparatus is secured to the deposition head.

14. The system of claim 9, wherein:
the deposition head is configured to form the plurality of layers of the three-dimensional object while the build chamber is heated, based on the build sequence data, such that the at least one of the layers defines a pocket having dimensions that correspond to dimensions of an insert of the at least one insert; and
the insert placement apparatus is configured to place the insert of the at least one insert in the pocket.

15. A system for building a three-dimensional object having an insert at least partially embedded in the three-dimensional object, the system comprising:
a build chamber having an environment that is configured to be enclosed and heated;
a deposition head at least partially disposed in the build chamber;
an insert supply unit disposed in the build chamber, the insert supply unit being configured to retain the insert within the build chamber;
an insert placement apparatus disposed in the build chamber; and
a controller disposed outside of the build chamber and in signal communication with the deposition head and the insert placement apparatus, wherein, while the build chamber is enclosed and heated, the controller is configured to direct the deposition head to form a plurality of layers of the three-dimensional object, to direct the insert placement apparatus to retrieve the insert from the insert supply unit, and to direct the insert placement apparatus to place the insert in the plurality of formed layers.

16. The system of claim 15, wherein the deposition head comprises an extrusion head having at least one extrusion tip for depositing a thermoplastic material to form the plurality of layers of the three-dimensional object.

17. The system of claim 15, wherein the insert supply unit comprises an insert magazine positioned at a predetermined location within the build chamber.

18. The system of claim 15, wherein the insert supply unit comprises a spool mount configured to receive and retain an insert spool, wherein the insert spool contains the insert.

19. The system of claim 15, wherein the insert placement apparatus comprises:
a base portion operably mounted within the build chamber at an offset location from the moveable head;
at least one arm portion pivotally connected to the base portion; and
an effector pivotally connected to the at least one arm portion.

20. The system of claim 15, wherein the insert placement apparatus comprises:
a base portion;
a plurality of arm segments configured to move between a retracted position and an extended position, wherein the plurality of arm segments are at least partially disposed within the base portion while in the retracted position; and
an effector connected to the plurality of arm segments.

* * * * *